US010891281B2

(12) United States Patent
Baum et al.

(10) Patent No.: US 10,891,281 B2
(45) Date of Patent: *Jan. 12, 2021

(54) STORING EVENTS DERIVED FROM LOG DATA AND PERFORMING A SEARCH ON THE EVENTS AND DATA THAT IS NOT LOG DATA

(71) Applicant: Splunk Inc., San Francisco, CA (US)

(72) Inventors: Michael Joseph Baum, Ross, CA (US); R. David Carasso, San Rafael, CA (US); Robin Kumar Das, Redwood City, CA (US); Rory Greene, San Francisco, CA (US); Bradley Hall, Palo Alto, CA (US); Nicholas Christian Mealy, Oakland, CA (US); Brian Philip Murphy, San Francisco, CA (US); Stephen Phillip Sorkin, San Francisco, CA (US); Andre David Stechert, Brooklyn, NY (US); Erik M. Swan, Piedmont, CA (US)

(73) Assignee: Splunk Inc., San Francisco, CA (US)

( * ) Notice: Subject to any disclaimer, the term of this patent is extended or adjusted under 35 U.S.C. 154(b) by 296 days.

This patent is subject to a terminal disclaimer.

(21) Appl. No.: 15/963,740

(22) Filed: Apr. 26, 2018

(65) Prior Publication Data
US 2018/0246919 A1 Aug. 30, 2018

Related U.S. Application Data

(63) Continuation of application No. 15/661,260, filed on Jul. 27, 2017, now Pat. No. 9,996,571, which is a
(Continued)

(51) Int. Cl.
*G06F 16/00* (2019.01)
*G06F 16/22* (2019.01)
(Continued)

(52) U.S. Cl.
CPC ...... *G06F 16/2272* (2019.01); *G06F 16/2228* (2019.01); *G06F 16/2291* (2019.01);
(Continued)

(58) Field of Classification Search
CPC .. G06F 16/2272; G06F 16/248; G06F 16/951; G06F 16/2228; G06F 16/2291;
(Continued)

(56) References Cited

U.S. PATENT DOCUMENTS

| 4,956,774 A | 9/1990 | Shibamiya et al. |
| 5,121,443 A | 6/1992 | Tomlinson |

(Continued)

FOREIGN PATENT DOCUMENTS

| EP | 1 480 100 | 11/2004 |
| KR | 10-0745-483 B1 | 8/2007 |

(Continued)

OTHER PUBLICATIONS

Bounsaythip, C., et al., "Overview of Data Mining for Customer Behavior Modeling," VTT Information Technology, Research Report TTE1-2001-18, Jun. 29, 2001, 59 pages., Retrieved from the Internet: <http://citeseerx.ist.psu.edu/viewdoc/download?doi10.1.1.22.3279&rep=rep1&type=pdf> [Sep. 20, 2010].
(Continued)

*Primary Examiner* — Noosha Arjomandi
(74) *Attorney, Agent, or Firm* — Knobbe, Martens, Olson & Bear, LLP

(57) ABSTRACT

Methods and apparatus consistent with the invention provide the ability to organize, index, search, and present time series data based on searches. Time series data are sequences of time stamped records occurring in one or more usually continuous streams, representing some type of activity. In one embodiment, time series data is stored as discrete events time stamps. A search is received and relevant event infor-
(Continued)

mation is retrieved based in whole or in part on the time stamp, a keyword indexing mechanism, or statistical indices calculated at the time of the search.

30 Claims, 7 Drawing Sheets

Related U.S. Application Data continuation of application No. 15/420,938, filed on Jan. 31, 2017, now Pat. No. 9,747,316, which is a continuation of application No. 14/611,170, filed on Jan. 30, 2015, now Pat. No. 9,594,789, which is a continuation of application No. 13/353,135, filed on Jan. 18, 2012, now Pat. No. 9,002,854, which is a continuation of application No. 11/868,370, filed on Oct. 5, 2007, now Pat. No. 8,112,425.

(60) Provisional application No. 60/828,283, filed on Oct. 5, 2006.

(51) Int. Cl.
| | | |
|---|---|---|
| *G06F 16/248* | | (2019.01) |
| *G06F 16/951* | | (2019.01) |
| *G06F 16/23* | | (2019.01) |
| *G06F 16/2458* | | (2019.01) |
| *G06F 16/2455* | | (2019.01) |
| *G06F 16/2457* | | (2019.01) |

(52) U.S. Cl.
CPC ........ *G06F 16/2322* (2019.01); *G06F 16/248* (2019.01); *G06F 16/2477* (2019.01); *G06F 16/24568* (2019.01); *G06F 16/24575* (2019.01); *G06F 16/24578* (2019.01); *G06F 16/951* (2019.01)

(58) Field of Classification Search
CPC ............. G06F 16/2322; G06F 16/2477; G06F 16/24568; G06F 16/24575; G06F 16/24578; G06F 16/1873; G06F 16/219
See application file for complete search history.

(56) References Cited

U.S. PATENT DOCUMENTS

| | | |
|---|---|---|
| 5,276,629 A | 1/1994 | Reynolds |
| 5,347,540 A | 9/1994 | Karrick |
| 5,414,838 A | 5/1995 | Kolton et al. |
| 5,613,113 A | 3/1997 | Goldring |
| 5,627,886 A | 5/1997 | Bowman |
| 5,737,600 A | 4/1998 | Geiner |
| 5,745,693 A | 4/1998 | Knight et al. |
| 5,751,965 A | 5/1998 | May et al. |
| 5,761,652 A | 6/1998 | Wu et al. |
| 5,847,972 A | 12/1998 | Eick |
| 5,951,541 A | 9/1999 | Simpson et al. |
| 5,953,439 A | 9/1999 | Ishihara et al. |
| 5,960,434 A | 9/1999 | Schimmel |
| 6,021,437 A | 2/2000 | Chen et al. |
| 6,088,717 A | 7/2000 | Reed et al. |
| 6,115,705 A | 9/2000 | Larson |
| 6,137,283 A | 10/2000 | Williams et al. |
| 6,212,494 B1 | 4/2001 | Boguraev |
| 6,341,176 B1 | 1/2002 | Shirasaki et al. |
| 6,363,131 B1 | 3/2002 | Beidas et al. |
| 6,449,618 B1 | 9/2002 | Blott |
| 6,490,553 B2 | 12/2002 | Van Thong et al. |
| 6,496,831 B1 | 12/2002 | Baulier et al. |
| 6,516,189 B1 | 2/2003 | Frangione et al. |
| 6,598,078 B1 | 7/2003 | Ehrlich et al. |
| 6,598,087 B1 | 7/2003 | Dixon, III et al. |
| 6,604,114 B1 | 8/2003 | Toong et al. |
| 6,658,367 B2 | 12/2003 | Conrad |
| 6,658,487 B1 | 12/2003 | Smith |
| 6,662,176 B2 | 12/2003 | Brunet et al. |
| 6,678,674 B1 | 1/2004 | Saeki |
| 6,725,287 B1 | 4/2004 | Loeb et al. |
| 6,751,228 B1 | 6/2004 | Okamura |
| 6,760,903 B1 | 7/2004 | Morshed et al. |
| 6,763,347 B1 | 7/2004 | Zhang |
| 6,768,994 B1 | 7/2004 | Howard et al. |
| 6,789,046 B1 | 9/2004 | Murstein et al. |
| 6,816,830 B1 | 11/2004 | Kempe |
| 6,907,422 B1 | 6/2005 | Predovic |
| 6,907,545 B2 | 6/2005 | Ramadei |
| 6,920,468 B1 | 7/2005 | Cousins |
| 6,951,541 B2 | 10/2005 | Desmarais |
| 6,980,963 B1 | 12/2005 | Hanzek |
| 6,993,246 B1 | 1/2006 | Pan et al. |
| 7,035,925 B1 | 4/2006 | Nareddy et al. |
| 7,069,176 B2 | 6/2006 | Swaine et al. |
| 7,084,742 B2 | 8/2006 | Haines |
| 7,085,682 B1 | 8/2006 | Heller et al. |
| 7,127,456 B1 | 10/2006 | Brown et al. |
| 7,146,416 B1 | 12/2006 | Yoo et al. |
| 7,184,777 B2 | 2/2007 | Diener et al. |
| 7,231,403 B1 | 6/2007 | Howitt et al. |
| 7,301,603 B2 | 11/2007 | Chen et al. |
| 7,376,752 B1 | 5/2008 | Chudnovsky et al. |
| 7,379,999 B1 | 5/2008 | Zhou et al. |
| 7,395,187 B2 | 7/2008 | Duyanovich et al. |
| 7,437,266 B2 | 10/2008 | Ueno et al. |
| 7,454,761 B1 | 11/2008 | Roberts et al. |
| 7,457,872 B2 | 11/2008 | Aton et al. |
| 7,493,304 B2 | 2/2009 | Day et al. |
| 7,523,191 B1 | 4/2009 | Thomas et al. |
| 7,546,553 B2 | 6/2009 | Bozak et al. |
| 7,565,425 B2 | 7/2009 | Van Vleet et al. |
| 7,580,938 B1 | 8/2009 | Pai et al. |
| 7,580,944 B2 | 8/2009 | Zhuge et al. |
| 7,593,953 B1 | 9/2009 | Malalur |
| 7,617,314 B1 | 11/2009 | Bansod et al. |
| 7,620,697 B1 | 11/2009 | Davies |
| 7,627,544 B2 | 12/2009 | Chkodrov |
| 7,653,742 B1 | 1/2010 | Bhargava et al. |
| 7,673,340 B1 | 3/2010 | Cohen |
| 7,685,109 B1 | 3/2010 | Ransil et al. |
| 7,747,641 B2 | 6/2010 | Kim et al. |
| 7,783,750 B1 | 8/2010 | Casey et al. |
| 7,809,131 B1 | 10/2010 | Njemanze et al. |
| 7,810,155 B1 | 10/2010 | Ravi |
| 7,827,182 B1 | 11/2010 | Panigrahy |
| 7,856,441 B1 | 12/2010 | Kraft et al. |
| 7,885,954 B2 | 2/2011 | Barsness et al. |
| 7,895,167 B2 | 2/2011 | Berg et al. |
| 7,925,678 B2 | 4/2011 | Botros et al. |
| 7,937,164 B2 | 5/2011 | Samardzija et al. |
| 7,937,344 B2 | 5/2011 | Baum et al. |
| 7,962,489 B1 | 6/2011 | Chiang et al. |
| 7,970,934 B1 | 6/2011 | Patel |
| 7,974,728 B2 | 7/2011 | Lin |
| 7,979,439 B1 | 7/2011 | Nordstrom et al. |
| 7,991,758 B2 | 8/2011 | Beeston |
| 8,005,992 B1 | 8/2011 | Pichumani et al. |
| 8,031,634 B1 | 10/2011 | Artzi et al. |
| 8,046,749 B1 | 10/2011 | Owen et al. |
| 8,073,806 B2 | 12/2011 | Garg et al. |
| 8,112,425 B2 | 2/2012 | Baum et al. |
| 8,301,603 B2 | 10/2012 | Kan et al. |
| 8,321,448 B2 | 11/2012 | Zeng et al. |
| 8,401,710 B2 | 3/2013 | Budhraja et al. |
| 8,589,375 B2 | 11/2013 | Zhang et al. |
| 8,601,112 B1 | 12/2013 | Nordstrom |
| 8,635,130 B1 | 1/2014 | Smith et al. |
| 8,645,390 B1 | 2/2014 | Oztekin et al. |
| 8,683,467 B2 | 3/2014 | Bingham et al. |
| 8,707,194 B1 | 4/2014 | Jenkins |
| 8,751,529 B2 | 6/2014 | Zhang et al. |
| 8,788,525 B2 | 7/2014 | Neels et al. |
| 8,793,118 B2 | 7/2014 | Srinivasa et al. |

(56) References Cited

U.S. PATENT DOCUMENTS

| | | | |
|---|---|---|---|
| 8,813,039 B2 * | 8/2014 | Maczuba | G06F 11/3692 |
| | | | 717/128 |
| 8,825,623 B2 | 9/2014 | Samuelson et al. | |
| 8,898,189 B2 * | 11/2014 | Nakano | G06F 16/2474 |
| | | | 707/773 |
| 8,904,299 B1 | 12/2014 | Owen et al. | |
| 8,904,389 B2 | 12/2014 | Bingham et al. | |
| 8,909,622 B1 | 12/2014 | Emigh et al. | |
| 8,914,601 B1 | 12/2014 | Lethin et al. | |
| 8,924,376 B1 * | 12/2014 | Lee | G06F 16/951 |
| | | | 707/723 |
| 8,990,184 B2 | 3/2015 | Baum et al. | |
| 9,002,854 B2 | 4/2015 | Baum et al. | |
| 9,037,555 B2 | 5/2015 | Genest et al. | |
| 9,043,185 B2 | 5/2015 | Bender | |
| 9,047,352 B1 | 6/2015 | Dong et al. | |
| 9,128,995 B1 | 9/2015 | Fletcher | |
| 9,130,832 B1 | 9/2015 | Boe et al. | |
| 9,130,860 B1 | 9/2015 | Boe et al. | |
| 9,146,954 B1 | 9/2015 | Boe et al. | |
| 9,146,962 B1 | 9/2015 | Boe et al. | |
| 9,152,726 B2 * | 10/2015 | Lymperopoulos | |
| | | | G06F 16/9537 |
| 9,158,811 B1 | 10/2015 | Choudhary et al. | |
| 9,164,786 B2 | 10/2015 | Bingham et al. | |
| 9,208,463 B1 | 12/2015 | Bhide et al. | |
| 9,215,240 B2 | 12/2015 | Merza et al. | |
| 9,256,501 B1 | 2/2016 | Rahut | |
| 9,286,413 B1 | 3/2016 | Coates et al. | |
| 9,294,361 B1 | 3/2016 | Choudhary et al. | |
| 9,384,203 B1 | 7/2016 | Seiver et al. | |
| 9,420,050 B1 | 8/2016 | Sakata et al. | |
| 9,465,713 B2 | 10/2016 | Tonouchi | |
| 9,495,187 B2 | 11/2016 | Bingham et al. | |
| 9,514,175 B2 * | 12/2016 | Swan | G06F 16/2228 |
| 9,521,047 B2 | 12/2016 | Alekseyev et al. | |
| 9,590,877 B2 | 3/2017 | Choudhary et al. | |
| 9,594,789 B2 | 3/2017 | Baum et al. | |
| 9,740,755 B2 | 8/2017 | Lamas et al. | |
| 9,747,316 B2 | 8/2017 | Baum et al. | |
| 9,767,197 B1 | 9/2017 | Agarwal et al. | |
| 9,785,417 B2 * | 10/2017 | Crossley | G06F 8/36 |
| 9,785,714 B2 | 10/2017 | Gabriel | |
| 9,792,351 B2 | 10/2017 | Hernandez-Sherrington et al. | |
| 9,922,065 B2 | 3/2018 | Swan et al. | |
| 9,922,066 B2 | 3/2018 | Swan et al. | |
| 9,922,067 B2 | 3/2018 | Baum et al. | |
| 9,928,262 B2 | 3/2018 | Baum et al. | |
| 9,996,571 B2 | 6/2018 | Baum et al. | |
| 10,019,496 B2 | 7/2018 | Bingham et al. | |
| 10,127,258 B2 | 11/2018 | Lamas et al. | |
| 10,216,779 B2 | 2/2019 | Swan et al. | |
| 10,242,039 B2 | 3/2019 | Baum et al. | |
| 10,255,312 B2 | 4/2019 | Swan et al. | |
| 10,262,018 B2 | 4/2019 | Swan et al. | |
| 10,318,541 B2 | 6/2019 | Bingham et al. | |
| 10,346,357 B2 | 7/2019 | Bingham et al. | |
| 10,353,957 B2 | 7/2019 | Bingham et al. | |
| 10,503,732 B2 * | 12/2019 | Kim | G06F 16/24568 |
| 10,592,522 B2 | 3/2020 | Bingham et al. | |
| 10,614,132 B2 | 4/2020 | Bingham et al. | |
| 10,678,767 B2 | 6/2020 | Baum et al. | |
| 2001/0044795 A1 | 11/2001 | Cohen et al. | |
| 2002/0042821 A1 | 4/2002 | Muret et al. | |
| 2002/0069223 A1 | 6/2002 | Goodisman et al. | |
| 2002/0129137 A1 | 9/2002 | Mills, III et al. | |
| 2002/0154175 A1 | 10/2002 | Abello et al. | |
| 2002/0169735 A1 | 11/2002 | Kil et al. | |
| 2002/0173911 A1 | 11/2002 | Brunet et al. | |
| 2003/0014399 A1 | 1/2003 | Hansen et al. | |
| 2003/0018435 A1 | 1/2003 | Jenner et al. | |
| 2003/0037034 A1 | 2/2003 | Daniels et al. | |
| 2003/0074401 A1 | 4/2003 | Connell et al. | |
| 2003/0110186 A1 | 6/2003 | Markowski et al. | |
| 2003/0120593 A1 | 6/2003 | Bansal et al. | |
| 2003/0141879 A1 | 7/2003 | Wilsher | |
| 2003/0154192 A1 | 8/2003 | Laborde et al. | |
| 2003/0182310 A1 | 9/2003 | Charnock et al. | |
| 2003/0204698 A1 | 10/2003 | Sachedina et al. | |
| 2003/0208472 A1 | 11/2003 | Pham | |
| 2003/0212699 A1 | 11/2003 | Denesuk et al. | |
| 2004/0024773 A1 | 2/2004 | Stoffel et al. | |
| 2004/0034795 A1 | 2/2004 | Anderson et al. | |
| 2004/0049693 A1 | 3/2004 | Douglas | |
| 2004/0073534 A1 | 4/2004 | Robson | |
| 2004/0122656 A1 | 6/2004 | Abir | |
| 2004/0143602 A1 | 7/2004 | Ruiz | |
| 2004/0169688 A1 | 9/2004 | Burdick et al. | |
| 2004/0170392 A1 | 9/2004 | Lu et al. | |
| 2004/0194141 A1 * | 9/2004 | Sanders | H04N 21/4828 |
| | | | 725/53 |
| 2004/0243618 A1 | 12/2004 | Malaney et al. | |
| 2004/0254919 A1 | 12/2004 | Giuseppini | |
| 2004/0267691 A1 | 12/2004 | Vasudeva | |
| 2005/0010564 A1 | 1/2005 | Metzger et al. | |
| 2005/0015624 A1 | 1/2005 | Ginter | |
| 2005/0021736 A1 | 1/2005 | Carusi | |
| 2005/0022207 A1 | 1/2005 | Grabarnik et al. | |
| 2005/0033803 A1 | 2/2005 | Vleet et al. | |
| 2005/0055357 A1 | 3/2005 | Campbell | |
| 2005/0071379 A1 | 3/2005 | Kekre et al. | |
| 2005/0076067 A1 | 4/2005 | Bakalash et al. | |
| 2005/0080806 A1 | 4/2005 | Doganata et al. | |
| 2005/0114331 A1 | 5/2005 | Wang et al. | |
| 2005/0114707 A1 | 5/2005 | Destefano et al. | |
| 2005/0125807 A1 | 6/2005 | Brady, Jr. et al. | |
| 2005/0138111 A1 | 6/2005 | Aton et al. | |
| 2005/0177372 A1 | 8/2005 | Wang et al. | |
| 2005/0203888 A1 | 9/2005 | Woosley | |
| 2005/0235356 A1 | 10/2005 | Wang | |
| 2005/0259776 A1 | 11/2005 | Kinser et al. | |
| 2005/0273281 A1 | 12/2005 | Wall et al. | |
| 2005/0289540 A1 | 12/2005 | Nguyen | |
| 2006/0004731 A1 | 1/2006 | Seibel et al. | |
| 2006/0004909 A1 | 1/2006 | Takuwa et al. | |
| 2006/0026164 A1 | 2/2006 | Jung | |
| 2006/0048101 A1 | 3/2006 | Krassovsky et al. | |
| 2006/0059238 A1 | 3/2006 | Slater et al. | |
| 2006/0069717 A1 | 3/2006 | Mamou et al. | |
| 2006/0085163 A1 | 4/2006 | Nader | |
| 2006/0143175 A1 | 6/2006 | Urkainczk et al. | |
| 2006/0149558 A1 | 7/2006 | Kahn et al. | |
| 2006/0153097 A1 | 7/2006 | Schultz et al. | |
| 2006/0161816 A1 | 7/2006 | Gula et al. | |
| 2006/0184529 A1 | 8/2006 | Berg et al. | |
| 2006/0184615 A1 | 8/2006 | Park et al. | |
| 2006/0197766 A1 | 9/2006 | Raz | |
| 2006/0197768 A1 | 9/2006 | Van Hook et al. | |
| 2006/0198359 A1 | 9/2006 | Fok et al. | |
| 2006/0212242 A1 | 9/2006 | Levine et al. | |
| 2006/0218278 A1 | 9/2006 | Uyama | |
| 2006/0218279 A1 | 9/2006 | Yamaguchi et al. | |
| 2006/0224254 A1 | 10/2006 | Rumi et al. | |
| 2006/0224583 A1 | 10/2006 | Fikes et al. | |
| 2006/0229931 A1 | 10/2006 | Fligler | |
| 2006/0265406 A1 | 11/2006 | Chkodrov et al. | |
| 2007/0027612 A1 | 2/2007 | Barfoot et al. | |
| 2007/0033632 A1 | 2/2007 | Baynger et al. | |
| 2007/0038603 A1 * | 2/2007 | Guha | G06F 16/9535 |
| 2007/0038889 A1 | 2/2007 | Wiggins | |
| 2007/0043562 A1 | 2/2007 | Holsinger et al. | |
| 2007/0043704 A1 * | 2/2007 | Raub | G06F 16/31 |
| 2007/0067575 A1 | 3/2007 | Morris | |
| 2007/0073519 A1 | 3/2007 | Long | |
| 2007/0073743 A1 | 3/2007 | Bammi et al. | |
| 2007/0074147 A1 | 3/2007 | Wold | |
| 2007/0100873 A1 | 5/2007 | Yako et al. | |
| 2007/0113031 A1 | 5/2007 | Brown et al. | |
| 2007/0124437 A1 | 5/2007 | Chervets | |
| 2007/0156786 A1 | 7/2007 | May et al. | |
| 2007/0156789 A1 | 7/2007 | Semerdzhiev et al. | |
| 2007/0192300 A1 | 8/2007 | Reuther et al. | |
| 2007/0255529 A1 | 11/2007 | Biazette et al. | |
| 2007/0283194 A1 | 12/2007 | Villella | |

(56) References Cited

U.S. PATENT DOCUMENTS

| | | |
|---|---|---|
| 2008/0027961 A1 | 1/2008 | Arlitt et al. |
| 2008/0077558 A1 | 3/2008 | Lawrence et al. |
| 2008/0083314 A1 | 4/2008 | Hayashi et al. |
| 2008/0134209 A1 | 6/2008 | Bansal et al. |
| 2008/0184110 A1 | 7/2008 | Barsness et al. |
| 2008/0215546 A1* | 9/2008 | Baum ............... G06F 16/24568 |
| 2008/0270799 A1 | 10/2008 | Yamaguchi et al. |
| 2008/0279113 A1 | 11/2008 | Kalliola |
| 2008/0319975 A1* | 12/2008 | Morris .................. G06F 3/048 |
| 2009/0083314 A1 | 3/2009 | Maim |
| 2009/0119257 A1 | 5/2009 | Waters |
| 2009/0172014 A1 | 7/2009 | Huetter |
| 2009/0172666 A1 | 7/2009 | Yahalom |
| 2009/0182866 A1 | 7/2009 | Watanabe et al. |
| 2009/0192982 A1* | 7/2009 | Samuelson ........... G06F 16/248 |
| 2009/0237404 A1 | 9/2009 | Cannon, III et al. |
| 2009/0259628 A1 | 10/2009 | Farrell |
| 2009/0271511 A1 | 10/2009 | Peracha |
| 2010/0205212 A1 | 8/2010 | Quadracci et al. |
| 2010/0223619 A1 | 9/2010 | Jaquet et al. |
| 2010/0235338 A1* | 9/2010 | Gabriel .................. H04L 67/02<br>707/706 |
| 2010/0250712 A1 | 9/2010 | Ellison et al. |
| 2010/0332661 A1 | 12/2010 | Tameshige et al. |
| 2011/0055256 A1 | 3/2011 | Phillips et al. |
| 2011/0161851 A1 | 6/2011 | Barber et al. |
| 2011/0179160 A1 | 7/2011 | Liu et al. |
| 2011/0238687 A1 | 9/2011 | Karpuram et al. |
| 2011/0261055 A1 | 10/2011 | Wong et al. |
| 2011/0298804 A1 | 12/2011 | Hao et al. |
| 2011/0307905 A1 | 12/2011 | Essey et al. |
| 2011/0314148 A1 | 12/2011 | Peterson et al. |
| 2012/0022707 A1 | 1/2012 | Budhraja |
| 2012/0036484 A1 | 2/2012 | Zhang et al. |
| 2012/0120078 A1 | 5/2012 | Hubbard et al. |
| 2012/0124503 A1 | 5/2012 | Coimbatore et al. |
| 2012/0174097 A1 | 7/2012 | Levin |
| 2012/0197928 A1 | 8/2012 | Zhang et al. |
| 2012/0216135 A1 | 8/2012 | Wong et al. |
| 2012/0221314 A1 | 8/2012 | Bourlatchkov et al. |
| 2012/0278292 A1 | 11/2012 | Zahavi et al. |
| 2012/0284713 A1 | 11/2012 | Ostermeyer et al. |
| 2012/0311153 A1 | 12/2012 | Morgan et al. |
| 2012/0311475 A1 | 12/2012 | Wong et al. |
| 2012/0317266 A1 | 12/2012 | Abbott |
| 2012/0323941 A1 | 12/2012 | Chkodrov et al. |
| 2012/0323970 A1 | 12/2012 | Larson et al. |
| 2013/0007261 A1 | 1/2013 | Dutta et al. |
| 2013/0030764 A1 | 1/2013 | Chatterjee et al. |
| 2013/0055092 A1 | 2/2013 | Cannon, III et al. |
| 2013/0097157 A1 | 4/2013 | Ng et al. |
| 2013/0124714 A1 | 5/2013 | Bendar |
| 2013/0204948 A1 | 8/2013 | Zeyliger et al. |
| 2013/0239111 A1 | 9/2013 | Bingham et al. |
| 2013/0247042 A1 | 9/2013 | Bingham et al. |
| 2013/0247043 A1 | 9/2013 | Bingham et al. |
| 2013/0247044 A1 | 9/2013 | Bingham et al. |
| 2013/0247133 A1 | 9/2013 | Price et al. |
| 2013/0262347 A1 | 10/2013 | Dodson |
| 2013/0300747 A1 | 11/2013 | Wong et al. |
| 2013/0332594 A1 | 12/2013 | Dvir |
| 2013/0346615 A1 | 12/2013 | Gondi |
| 2014/0040306 A1 | 2/2014 | Gluzman et al. |
| 2014/0075029 A1 | 3/2014 | Lipchuk et al. |
| 2014/0173029 A1* | 6/2014 | Varney ............... H04L 41/0869<br>709/217 |
| 2014/0214888 A1* | 7/2014 | Marquardt ............ G06F 16/284<br>707/769 |
| 2014/0280894 A1 | 9/2014 | Reynolds et al. |
| 2014/0283083 A1 | 9/2014 | Gula et al. |
| 2014/0324862 A1 | 10/2014 | Bingham et al. |
| 2014/0351217 A1 | 11/2014 | Bostock |
| 2015/0026167 A1 | 1/2015 | Neels et al. |
| 2015/0143180 A1 | 5/2015 | Dawson |
| 2015/0149879 A1 | 5/2015 | Miller et al. |
| 2015/0154269 A1 | 6/2015 | Miller et al. |
| 2015/0178342 A1 | 6/2015 | Seering |
| 2015/0293954 A1 | 10/2015 | Hsiao et al. |
| 2015/0295778 A1 | 10/2015 | Hsiao et al. |
| 2015/0295780 A1 | 10/2015 | Hsiao et al. |
| 2015/0295796 A1 | 10/2015 | Hsiao et al. |
| 2015/0339351 A1 | 11/2015 | Swan et al. |
| 2015/0379065 A1* | 12/2015 | Yoshizawa ............ G06F 16/245<br>707/689 |
| 2016/0019215 A1 | 1/2016 | Murphey et al. |
| 2016/0034555 A1 | 2/2016 | Rahut et al. |
| 2016/0034566 A1 | 2/2016 | Rahut |
| 2016/0055225 A1 | 2/2016 | Xu et al. |
| 2016/0070736 A1 | 3/2016 | Swan et al. |
| 2016/0125314 A1 | 5/2016 | Mulukutla et al. |
| 2016/0127465 A1* | 5/2016 | Barstow ................ G06F 16/273<br>707/620 |
| 2016/0140128 A1 | 5/2016 | Swan et al. |
| 2016/0154836 A1 | 6/2016 | Swan et al. |
| 2016/0360382 A1* | 12/2016 | Gross .................. G06F 3/04883 |
| 2017/0046402 A1 | 2/2017 | Swan et al. |
| 2017/0046403 A1 | 2/2017 | Swan et al. |
| 2017/0114810 A1 | 4/2017 | Angerhausen et al. |
| 2017/0139961 A1 | 5/2017 | Baum et al. |
| 2017/0139962 A1 | 5/2017 | Baum et al. |
| 2017/0139963 A1 | 5/2017 | Baum et al. |
| 2017/0139968 A1 | 5/2017 | Baum et al. |
| 2017/0169082 A1 | 6/2017 | Bingham et al. |
| 2017/0169134 A1 | 6/2017 | Bingham et al. |
| 2017/0169137 A1 | 6/2017 | Bingham et al. |
| 2017/0213007 A1* | 7/2017 | Moturu .................. G16H 40/20 |
| 2017/0255639 A1 | 9/2017 | Bingham et al. |
| 2017/0255683 A1 | 9/2017 | Bingham et al. |
| 2017/0255711 A1 | 9/2017 | Bingham et al. |
| 2017/0286499 A1 | 10/2017 | Bingham et al. |
| 2017/0337230 A1 | 11/2017 | Baum et al. |
| 2017/0337231 A1 | 11/2017 | Baum et al. |
| 2017/0344591 A1 | 11/2017 | Baum |
| 2018/0157693 A1 | 6/2018 | Swan et al. |
| 2018/0173739 A1 | 6/2018 | Baum |
| 2018/0225319 A1 | 8/2018 | Baum |
| 2018/0341596 A1 | 11/2018 | Teotia et al. |
| 2019/0098106 A1 | 3/2019 | Mungel et al. |
| 2019/0147084 A1 | 5/2019 | Pal et al. |
| 2019/0163673 A1 | 5/2019 | Swan et al. |
| 2019/0171629 A1 | 6/2019 | Baum et al. |
| 2019/0171630 A1 | 6/2019 | Swan et al. |
| 2019/0179815 A1 | 6/2019 | Bingham et al. |
| 2019/0205449 A1 | 7/2019 | Erickson et al. |
| 2019/0303365 A1 | 10/2019 | Bingham et al. |

FOREIGN PATENT DOCUMENTS

| | | |
|---|---|---|
| WO | WO 1997/038376 | 10/1997 |
| WO | WO 2003/096220 | 11/2003 |
| WO | WO 2008/043082 | 4/2008 |

OTHER PUBLICATIONS

Cooley, R., et al., "Data Preparation for Mining World Wide Web Browsing Patterns," Knowledge and Information Systems 1, Springer-Verlab, 1999, 25 pages, Retrieved from the Internet: <http://citeseerx.ist.psu.edu/viewdoc/download?doi=10.1.1.161.5884&rep=rep1&type=pdf> [Sep. 21, 2010].

Dell, Inc., "Foglight for Virtualization, Free Edition," http://www.quest.com/foglight-for-virtualization-free-edition/, 1 pages, published prior to Apr. 30, 2013.

Foglight for Virtualization retrieved from quest.com/foglight-for-virtualization-free-edition/ on Sep. 30, 2013, 1 page.

Forlizzi, L. et al., "A data model and data structures for moving objects databases," SIGMOD Record, ACM, New York, NY, vol. 29, No. 2, Jun. 1, 2000, pp. 319-330, XP002503045.

Gleed, Kyle, Viewing ESXi Logs from the DCUI, Jun. 2012, Retrieved from the Internet: URL:https://blogs.vmware.com/vsphere/author/kyle_gleed>.

(56) References Cited

OTHER PUBLICATIONS

Golden, et al., "In Search of Meaning for Time Series Subsequence Clustering: Matching Algorithms Based on a New Distance Measure." 15th ACM International Conference on Information and Knowledge Management, pp. 347-356, Nov. 2006.
Han, E. H., et al., "Text Categorization Using Weight Adjusted k-Nearest Neighbor Classification," PAKDD 2001, LNAI 2035, pp. 23-65, Retrieved from the Internet: <http://springlerlink.com/index25gnd0jb6nklffhh.pdf> [Sep. 23, 2010].
Hoke, Evan et al., "InteMon: Continuous Mining of Sensor Data in Large-scale Self-*Infrastructures", ACM SIGOPS Operating Systems Review, vol. 40 Issue 3, Jul. 2006, ACM Press, 7 pgs.
Kolovson, C. et al., "Indexing Techniques for Historical Databases," Proceedings of the Fifth International Conference on Data Engineering, Los Angeles, CA, IEEE Comput. Soc., Feb. 6-10, 1989, pp. 127-137.
Leung. T.Y.C. et al., "Query processing for temporal databases," Proceedings of the International Conference on Data Engineering, Los Angeles, IEEE, Comp. Soc. Press, vol. Conf. 6, Feb. 5-9, 1990, pp. 200-208, XP010018207.
Matsuo, Y., "Keyword Extraction from a Single Document Using Word Co-Occurrence Statistical Information," Proceedings of the Sixteenth International Florida Artificual Intelligence Research Society Conference, May 12-14, 2003, 5 pages, Retrieved from the Internet: <http://www.aaai.org/Papers/FLAIRS/2003/Flairs03-076.pdf> [Sep. 27, 2010].
Russel, S. J., et al., "Artificial Intelligence: A Modern Approach, 2nd Edition," Pearson Education, Inc. 2003, pp. 733-739.
Stamatatos, E., et al., "Text Genre Detection Using Common Word Frequencies," Proceedings of the 18th International Conference on Computational Linguistics, vol. 2, 2000, pp. 808-814, Retrieved from the Internet: <http://portal.acm/citation.cfm?id=992763> [Sep. 23, 2010].
Srivastava, J. et al., "Web Usage Mining: Discovery and Application of Usage Patterns from Web Data," ACM SIGKDD Explorations Newsletter, vol. 1, Issue 2, Jan. 2000, pp. 12-23, http://www.portal.acm.org/citation.cfm?is=846188, retrieved Sep. 21, 2010.
VCenter Operations Manager 5.7.2 retrieved from vmware.com/support/pubs/vcops-pubs.html on Sep. 30, 2013, 2 pages.
VMware, Inc., "VMware vCenter Operations Manager Documentation, vCenter Operations Manager 5.7," http://www.vmware.com/support/pubs/vcops-pubs.html, 1 page, Apr. 4, 2013.
Witten, I. H., et al., "Inferring Rudimentary Rules," Data Mining: Practical Machine Learning Tools and Techniques with Java Implementations, Morgan Kaufmann Publishers, 2000, pp. 80-82, 114-118, 210-218, 220-227, 329-335.
Chinese Patent Office, Application No. 200780044899.5, Official Communication, dated Mar. 9, 2011.
Chinese Patent Office, Application No. 200780044899.5, Official Communication, dated Feb. 23, 2012.
Chinese Patent Office, Application No. 201210293010.X Foreign Office Action dated Oct. 27, 2015
Chinese Patent Office, Application No. 201210293010.X Pending Claims as of Oct. 27, 2015.
European Patent Office, Application No. 07853813.9, Extended Search Report dated Dec. 11, 2009.
European Patent Office, Application No. 07853813.9, Examination Report dated Mar. 15, 2010.
European Patent Office, Application No. 07853813.9, Foreign Official Communication dated Apr. 9, 2013.
European Patent Office, Application No. 07853813.9, Foreign Office Action dated Nov. 24, 2015.
European Patent Office, Application No. 07853813.9, Pending Claims as of Nov. 24, 2015.
European Patent Office, Application No. 12159074.9, Extended Search Report dated Jul. 4, 2012.
European Patent Office, Application No. 12159074.9, Foreign Office Action dated Jun. 23, 2015.
European Patent Office, Application No. 12159074.9, Pending Claims as of Jun. 23, 2015.
European Patent Office, Application No. 12159074.9, Summons to Oral Proceedings and Claims dated Dec. 6, 2017.
International Patent Office, Application No. PCT/US2006/029019, International Search Report and Written Opinion, dated Aug. 3, 2007.
International Patent Office, Application No. PCT/US2007/080616, International Search Report and Written Opinion, dated Jun. 12, 2008.
Japanese Patent Office, Application No. 2009-531632, Official Communication dated Jul. 27, 2012.
Korean Patent Office, Application No. 10-2009-7009378, Official Communication, dated Jun, 21, 2012.
Korean Patent Office, Application No. 10-2012-7009888, Official Communication, dated Feb. 15, 2012.
U.S. Appl. No. 13/353,135, Non-Final Office Action dated Feb. 22, 2013.
U.S. Appl. No. 13/353,135, Final Office Action dated Sep. 20, 2013.
U.S. Appl. No. 13/353,135, Non-Final Office Action dated Feb. 26, 2014.
U.S. Appl. No. 13/353,135, Final Office Action dated Jul. 25, 2014.
U.S. Appl. No. 13/353,135, Advisory Action dated Aug. 25, 2014.
U.S. Appl. No. 13/353,135, Notice of Allowance dated Nov. 26, 2014.
U.S. Appl. No. 11/868,370, Official Communication, dated May 28, 2010.
U.S. Appl. No. 11/868,370, Official Communication, dated Nov. 5, 2010.
U.S. Appl. No. 11/868,370, Official Communication, dated May 13, 2011.
U.S. Appl. No. 11/868,370, Official Communication (NofA), dated Dec. 2, 2011.
U.S. Appl. No. 13/664,186, Official Communication dated Feb. 25, 2013.
U.S. Appl. No. 13/664,186, Final Office Action dated Sep. 10, 2013.
U.S. Appl. No. 13/664,186, Non-Final Office Action dated Jan. 27, 2014.
U.S. Appl. No. 13/664,186, Final Office Action dated Jul. 9, 2014.
U.S. Appl. No. 13/664,186, Notice of Allowance dated Jan. 9, 2015.
U.S. Appl. No. 13/874,423 of Bingham et al. filed Apr. 30, 2013.
Non-Final Office Action dated Jul. 30, 2013, for U.S. Appl. No. 13/874,423, of Bingham et al. filed Apr. 30, 2013.
Final Office Action dated Jan. 6, 2014, for U.S. Appl. No. 13/874,423 of Bingham et al. filed Apr. 30, 2013.
Non-Final Office Action dated May 27, 2014, for U.S. Appl. No. 13/874,423 of Bingham et al. filed Apr. 30, 2013.
Notice of Allowance and Fees Due dated Sep. 22, 2014. for U.S. Appl. No. 13/874,423 of Bingham et al. filed Apr. 30, 2013.
U.S. Appl. No. 13/874,434 of Bingham et al. filed Apr. 30, 2013.
Non-Final Office Action dated Aug. 8, 2013 for U.S. Appl. No. 13/874,434 of Bingham et al. filed Apr. 30, 2013.
Notice of Allowance and Fees Due dated Dec. 23, 2013, for U.S. Appl. No. 13/874,434 of Bingham et al. filed Apr. 30, 2013.
Corrected Notice of Allowability dated Feb. 11, 2014, for U.S. Appl. No. 13/874,434 of Bingham et al. filed Apr. 30, 2013.
U.S. Appl. No. 13/874,441 of Bingham et al. filed Apr. 30, 2013.
Non-Final Office Action dated Aug. 26, 2013, for U.S. Appl. No. 13/874,441 of Bingham et al. filed Apr. 30, 2013.
Final Office Action dated Jan. 6, 2014, for U.S. Appl. No. 13/874,441 of Bingham et al. filed Apr. 30, 2013.
Advisory Action dated Mar. 25, 2014, for U.S. Appl. No. 13/874,441 of Bingham et al. filed Apr. 30, 2013.
Non-Final Office Action dated Jun. 5, 2014, for U.S. Appl. No. 13/874,441 of Bingham et al. filed Apr. 30, 2013.
Notice of Allowance dated Oct. 22, 2014, for U.S. Appl. No. 13/874,441 of Bingham et al. filed Apr. 30, 2013.
U.S. Appl. No. 13/874,448 of Bingham et al. filed Apr. 30, 2013.
Non-Final Office Action dated Jul. 26, 2013, for U.S. Appl. No. 13/874,448 of Bingham et al. filed Apr. 30, 2013.
Final Office Action dated Mar. 25, 2014, for U.S. Appl. No. 13/874,448 of Bingham et al. filed Apr. 30, 2013.
Non-Final Office Action dated Jul. 16, 2014, for U.S. Appl. No. 13/874,448 of Bingham et al. filed Apr. 30, 2013.

(56) References Cited

OTHER PUBLICATIONS

Final Office Action dated Jan. 28, 2015, for U.S. Appl. No. 13/874,448 of Bingham et al. filed Apr. 30, 2013.
Notice of Allowance and Fees Due dated Jul. 6, 2016, for U.S. Appl. No. 13/874,448 of Bingham et al. filed Apr. 30, 2013.
U.S. Appl. No. 14/167,316 of Bingham et al. filed Jan. 29, 2014.
First Action Interview Pilot Program Pre-Interview Communication dated May 19, 2014, for U.S. Appl. No. 14/167,316 of Bingham et al. filed Jan. 29, 2014.
First Action Interview Office Action dated Jul. 15, 2014 in U.S. Appl. No. 14/167,316.
Final Office Action dated Nov. 4, 2014, for U.S. Appl. No. 14/167,316 of Bingham et al. filed Jan. 29, 2014.
Non-Final Office Action dated Oct. 19, 2015, for U.S. Appl. No. 14/167,316 of Bingham et al. filed Jan. 29, 2014.
Final Office Action dated Feb. 22, 2016, for U.S. Appl. No. 14/167,316 of Bingham et al. filed Jan. 29, 2014.
Non-Final Office Action dated Sep. 13, 2016, for U.S. Appl. No. 14/167,316 of Bingham et al. filed Jan. 29, 2014.
Notice of Allowance dated Apr. 25, 2017, U.S. Appl. No. 14/167,316 of Bingham et al. filed Jan. 29, 2014.
Notice of Allowance dated Jun. 26, 2017, U.S. Appl. No. 14/167,316 of Bingham et al. filed Jan. 29, 2014.
Notice of Corrected Allowability dated Jul. 5, 2017, 2017, U.S. Appl. No. 14/167,316 of Bingham et al. filed Jan. 29, 2014.
Non-Final Office Action dated Aug. 18, 2017, 2017, U.S. Appl. No. 14/167,316 of Bingham et al. filed Jan. 29, 2014.
U.S. Appl. No. 14/611,170, Non-Final Office Action dated Jun. 2, 2016.
U.S. Appl. No. 14/611,170, Notice of Allowance dated Nov. 16, 2016.
U.S. Appl. No. 14/815,980, Non-Final Office Action dated Jul. 15, 2016.
U.S. Appl. No. 14/815,980, Final Office Action dated Jan. 18, 2017.
U.S. Appl. No. 14/815,980, Advisory Action dated Apr. 3, 2017.
U.S. Appl. No. 14/815,980, Final Office Action dated Jul. 26, 2017.
U.S. Appl. No. 14/815,980, Final Rejection dated Jan. 17, 2018.
U.S. Appl. No. 14/929,248, Non-Final Office Action dated Mar. 22, 2017.
U.S. Appl. No. 14/929,248, Final Office Action dated Jul. 18, 2017.
U.S. Appl. No. 14/929,248, Notice of Allowance dated Dec. 14, 2017.
U.S. Appl. No. 15/007,176, Non-Final Office Action dated Apr. 22, 2016.
U.S. Appl. No. 15/007,176, Notice of Allowance dated Oct. 3, 2016.
U.S. Appl. No. 15/008,425, Non-Final Office Action dated Aug. 9, 2016.
U.S. Appl. No. 15/008,425, Final Office Action dated Jan. 31, 2017.
U.S. Appl. No. 15/008,425, Advisory Action dated Mar. 29, 2017.
U.S. Appl. No. 15/008,425, Non-Final Office Action dated Aug. 9, 2017.
U.S. Appl. No. 15/008,425, Final Office Action dated Jan. 31, 2018.
U.S. Appl. No. 15/008,428, Non-Final Office Action dated May 4, 2016.
U.S. Appl. No. 15/008,428, Final Office Action dated Oct. 13, 2016.
U.S. Appl. No. 15/008,428, Advisory Action dated Dec. 14, 2016.
U.S. Appl. No. 15/008,428, Non-Final Office Action dated Mar. 20, 2017.
U.S. Appl. No. 15/008,428, Final Office Action dated Jul. 14, 2017.
U.S Appl. No. 15/008,428, Notice of Allowance dated Dec. 19, 2017.
U.S. Appl. No. 15/339,887, of Swan, et al. filed Oct. 31, 2016.
U.S. Appl. No. 15/339,887, Non-Final Action dated Jan. 25, 2018, of Swan, et al. filed Oct. 31, 2016.
U.S. Appl. No. 15/339,953, of Swan et al. filed Nov. 1, 2016.
Non Final Office Action, dated Februry 8, 2018, re U.S. Appl. No. 15/339,953, of Swan et al. filed Nov. 1, 2016.
U.S. Appl. No. 15/420,938 of Baum, M.J. et al. filed Jan. 31, 2017.
Notice of Allowance dated Jun. 15, 2017, for U.S. Appl. No. 15/420,938 of Baum, M.J. et al. filed Jan. 31, 2017.
U.S. Appl. No. 15/420,985 of Baum, M.J. et al. filed Jan. 31, 2017.
U.S. Appl. No. 15/420,985, Non-Final Action dated Apr. 3, 2017.
U.S. Appl. No. 15/421,068 of Baum, M.J. et al. filed Jan. 31, 2017.
Non-Final Office Action dated Jun. 28, 2017, for U.S. Appl. No. 15/421,068 of Baum, M.J. et al. filed Jan. 31, 2017.
U.S. Appl. No. 15/421,348, of Bingham et al. filed Jan. 31, 2017.
Non-Final Office Action dated May 19, 2017, for U.S. Appl. No. 15/421,348 of Bingham et al. filed Jan. 31, 2017.
Final Office Action dated Aug. 11, 2017, for U.S. Appl. No. 15/421,348 of Bingham et al. filed Jan. 31, 2017.
Office Action dated Dec. 29, 2017, for U.S. Appl. No. 15/421,348 of Bingham et al. filed Jan. 31, 2017.
Non-Final Office Action dated May 26, 2014, for U.S. Appl. No. 15/421,353 of Bingham et al. filed Jan. 31, 2007.
U.S. Appl. No. 15/421,353 of Bingham et al. filed Jan. 31, 2007.
Final Office Action dated Aug. 25, 2017, for U.S. Appl. No. 15/421,353 of Bingham et al. filed Jan. 31, 2007.
U.S. Appl. No. 15/421,370 of Bingham et al. filed Jan. 31, 2017.
Non-Final Office Action dated Apr. 27, 2017, for U.S. Appl. No. 15/421,370 of Bingham et al. filed Jan. 31, 2017.
Final Office Action dated Oct. 20, 2017, for U.S. Appl. No. 15/421,370 of Bingham et al. filed Jan. 31, 2017.
Non-Final Office Action dated Mar. 8, 2018, for U.S. Appl. No. 15/421,370 of Bingham et al. filed Jan. 31, 2017.
U.S. Appl. No. 15/421,382 of Bingham et al. filed Jan. 31, 2017.
Non-Final Office Action dated May 19, 2017, for U.S. Appl. No. 15/421,382 of Bingham et al. filed Jan. 31, 2017.
Non-Final Office Action dated Jun. 19, 2017, for U.S. Appl. No. 15/421,382 of Bingham et al. filed Jan. 31, 2017.
Final Office Action dated Aug. 11, 2017, for U.S. Appl. No. 15/421,382 of Bingham et al. filed Jan. 31, 2017.
Notice of Appeal dated Dec. 11, 2017, for U.S. Appl. No. 15/421,382 of Bingham et al. filed Jan. 31, 2017.
Non-Final Office Action dated Apr. 5, 2018, for U.S. Appl. No. 15/421,382 of Bingham et al. filed Jan. 31, 2017.
U.S. Appl. No. 15/421,395 of Bingham et al. filed Jan. 31, 2017.
Non-Final Office Action dated May 8, 2017, for U.S. Appl. No. 15/421,395 of Bingham et al. filed Jan. 31, 2017.
Non-Final Office Action dated Oct. 4, 2017, for U.S. Appl. No. 15/421,395 of Bingham et al. filed Jan. 31, 2017.
Non-Final Office Action dated Apr. 5, 2018, for U.S. Appl. No. 15/421,395 of Bingham et al. filed Jan. 31, 2017.
U.S. Appl. No. 15/421,398 of Bingham et al. filed Jan. 31, 2007.
Non-Final Office Action dated Jun. 1, 2017, for U.S. Appl. No. 15/421,398 of Bingham et al. filed Jan. 31, 2007.
Final Office Action dated Nov. 2, 2017, for U.S. Appl. No. 15/421,398 of Bingham et al. filed Jan. 31, 2007.
Non-Final Office Action dated Apr. 5, 2018, for U.S. Appl. No. 15/421,398 of Bingham et al. filed Jan. 31, 2007.
U.S. Appl. No. 15/421,412 of Bingham et al. filed Jan. 31, 2017.
Non-Final Office Action dated Apr. 27, 2017, for U.S. Appl. No. 15/421,412 of Bingham et al. filed Jan. 31, 2017.
Final Office Action dated Aug. 3, 2017, for U.S. Appl. No. 15/421,412 of Bingham et al. filed Jan. 31, 2017.
Advisory Action dated Sep. 14, 2017, for U.S. Appl. No. 15/421,412 of Bingham et al. filed Jan. 31, 2017.
Notice of Allowance and Fees Due dated Mar. 15, 2018, for U.S. Appl. No. 15/421,412 of Bingham et al. filed Jan. 31, 2017.
U.S. Appl. No. 15/421,416, of Baum et al. filed Jan. 31, 2017.
U.S. Appl. No. 15/421,416, Office Action dated Feb. 8, 2018, of Baum et al. filed Jan. 31, 2017.
U.S. Appl. No. 15/661,260, of Baum et al. filed Jul. 27, 2017.
Notice of Allowance dated Feb. 9, 2018, re U.S. Appl. No. 15/661,260, of Baum et al. filed Jul. 27, 2017.
U.S. Appl. No. 15/661,268, of Baum et al. filed Jul. 27, 2017.
Notice of Allowance dated Dec. 19, 2017 in U.S. Appl. No. 15/661,268, of Baum et al. filed Jul. 27, 2017.
U.S. Appl. No. 15/661,286, of Baum et al. filed Jul. 27, 2017.
Notice of Allowance dated Nov. 17, 2017 in U.S. Appl. No. 15/661,286, of Baum et al. filed Jul. 27, 2017.
U.S. Appl. No. 15/883,552, of Baum et al. filed Jan. 30, 2018.
U.S. Appl. No. 15/883,588, of Baum et al. filed Jan. 30, 2018.

(56) References Cited

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.
Carraso, David, "Exploring Splunk," published by CITO Research, New York, NY, Apr. 2012.
Chaudhuri, S., "An Overview of Query Optimization in Relational Systems," Processing of the 1998 ACM SIGACT-SIGMODE-SIGART Symposium on Principles of Database Systems, pp. 34-43, 1998.
Graefe, G., "Query Evaluation Techniques for Large Databases," ACM Computing Surveys, vol. 25, No. 2, pp. 73-170, Jun. 1993.
SLAML 10 Reports, Workshop on Managing Systems via Log Analysis and Machine Learning Techniques, ;login: Feb. 2011 Conference Reports.
Splunk Enterprise 8.0.0 Overview, available online, retrieved May 20, 2020 from docs.splunk.com.
Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Witten, et al.:, "Algorithms: the basic methods," Data Mining Practical Machine Learning Tools and Techniques with Java Implementations, pp. 79-118, 2000.
Witten, et al.:, "Numeric Prediction," Data Mining Practical Machine Learning Tools and Techniques with Java Implementations, pp. 201-227, 2000.
European Patent Office, Application No. 07853813.9, Summons to Oral Proceedings dated Mar. 20, 2019.
European Extended Search Report dated May 3, 2019, Application No. 18203898.4.
U.S. Appl. No. 14/815,980, Non-Final Rejection dated Jul. 10, 2018.
U.S. Appl. No. 14/815,980, Final Office Action dated Jan. 14, 2019.
U.S. Appl. No. 14/815,980, Notice of Allowance dated Oct. 23, 2019.
U.S. Appl. No. 14/815,980, Notice of Allowance dated Apr. 2, 2020.
U.S. Appl. No. 15/008,425, Office Action dated Jul. 11, 2018.
U.S. Appl. No. 15/008,425, Notice of Allowance dated Oct. 11, 2018.
U.S. Appl. No. 15/339,887, Final Action dated Aug. 2, 2018, of Swan, et al. filed Oct. 31, 2016.
U.S. Appl. No. 15/339,887, Notice of Allowance dated Dec. 19, 2018, of Swan, et al. filed Oct. 31, 2016.
Final Office Action, dated Aug. 1, 2018, re U.S. Appl. No. 15/339,953, of Swan et al. filed Nov. 1, 2016.
Notice of Allowance, dated Dec. 18, 2018, re U.S. Appl. No. 15/339,953, of Swan et al. filed Nov. 1, 2016.
Final Office Action dated Jul. 20, 2018, for U.S. Appl. No. 15/421,348 of Bingham et al. filed Jan. 31, 2017.
Office Action dated Dec. 31, 2018, for U.S. Appl. No. 15/421,348 of Bingham et al. filed Jan. 31, 2017.
Office Action dated Aug. 1, 2019, for U.S. Appl. No. 15/421,348 of Bingham et al. filed Jan. 31, 2017.
Final Office Action dated Jan. 31, 2020, for U.S. Appl. No. 15/421,348 of Bingham et al. filed Jan. 31, 2017.
Office Action dated May 28, 2020, for U.S. Appl. No. 15/421,348 of Bingham et al. filed Jan. 31, 2017.
Non-Final Rejection dated Apr. 23, 2018, for U.S. Appl. No. 15/421,353 of Bingham et al. filed Jan. 31, 2007.
Notice of Allowance dated Oct. 15, 2018, for U.S. Appl. No. 15/421,353 of Bingham et al. filed Jan. 31, 2007.
Final Office Action dated Aug. 15, 2018, for U.S. Appl. No. 15/421,370 of Bingham et al. filed Jan. 31, 2017.
Notice of Allowance dated Feb. 27, 2019, for U.S. Appl. No. 15/421,370 of Bingham et al. filed Jan. 31, 2017.
Final Office Action dated Aug. 8, 2018, for U.S. Appl. No. 15/421,382 of Bingham et al. filed Jan. 31, 2017.
Non-Final Office Action dated Mar. 1, 2019, for U.S. Appl. No. 15/421,382 of Bingham et al. filed Jan. 31, 2017.
Notice of Allowance dated Sep. 26, 2019, for U.S. Appl. No. 15/421,382, 8 pages.
Notice of Allowance dated Mar. 5, 2020, for U.S. Appl. No. 15/421,382, 2 pages.
Final Office Action dated Oct. 17, 2018, for U.S. Appl. No. 15/421,395 of Bingham et al. filed Jan. 31, 2017.
Notice of Allowance dated Jan. 28, 2019, for U.S. Appl. No. 15/421,395 of Bingham et al. filed Jan. 31, 2017.
Final Office Action dated Aug. 31, 2018, for U.S. Appl. No. 15/421,398 of Bingham et al. filed Jan. 31, 2007.
Notice of Allowance dated Feb. 20, 2019, for U.S. Appl. No. 15/421,398 of Bingham et al. filed Jan. 31, 2007.
U.S. Appl. No. 15/421,416, Final Office Action dated Jul. 31, 2018, of Baum et al. filed Jan. 31, 2017.
U.S. Appl. No. 15/421,416, Notice of Allowance dated Jan. 9, 2019, of Baum et al. filed Jan. 31, 2017.
Notice of Allowance dated Apr. 8, 2020 in U.S. Appl. No. 15/883,552, 31 pages.
Non-Final Office Action dated Aug. 15, 2019 in U.S. Appl. No. 16/000,745, 9 pages.
Notice of Allowance dated Nov. 22, 2019 in U.S. Appl. No. 16/000,745, 8 pages.
Non-Final Office Action dated Oct. 21, 2019 in U.S. Appl. No. 16/397,466, 7 pages.
Final Office Action dated Apr. 2, 2020 in U.S. Appl. No. 16/397,466, 6 pages.
Notice of Allowance dated May 27, 2020 in U.S. Appl. No. 16/397,466, 8 pages.
Non-Final Office Action dated Oct. 31, 2019 in U.S. Appl. No. 16/262,824, 27 pages.
Non-Final Office Action dated May 12, 2020 in U.S. Appl. No. 16/262,824, 29 pages.
Baum et al., U.S. Appl. No. 15/420,985, filed Jan. 31, 2017.
Baum et al., U.S. Appl. No. 15/420,938, filed Jan. 31, 2017.
Baum et al., U.S. Appl. No. 15/421,068, filed Jan. 31, 2017.
Baum et al., U.S. Appl. No. 15/661,260, filed Jul. 27, 2017.
Baum et al., U.S. Appl. No. 15/661,268, filed Jul. 27, 2017.
Baum et al., U.S. Appl. No. 15/661,286, filed Jul. 27, 2017.
Baum et al., U.S. Appl. No. 15/883,552, filed Jan. 30, 2018.
Baum et al., U.S. Appl. No. 15/883,588, filed Jan. 30, 2018.

* cited by examiner

STORING EVENTS DERIVED FROM LOG DATA AND PERFORMING A SEARCH ON THE EVENTS AND DATA THAT IS NOT LOG DATA

RELATED APPLICATIONS

The present application is a continuation of U.S. patent application Ser. No. 15/661,260, filed on Jul. 27, 2017; which is a continuation of U.S. patent application Ser. No. 15/420,938, filed on Jan. 31, 2017; which is a continuation of U.S. patent application Ser. No. 14/611,170, filed on Jan. 30, 2015; which is a continuation of U.S. patent application Ser. No. 13/353,135, filed on Jan. 18, 2012, issued as U.S. Pat. No. 9,002,854 on Apr. 7, 2015; which is a continuation of U.S. patent application Ser. No. 11/868,370, filed Oct. 5, 2007, issued as U.S. Pat. No. 8,112,425 on Feb. 7, 2012; which claims priority under 35 U.S.C. § 119(e) to U.S. Provisional Patent Application No. 60/828,283, filed Oct. 5, 2006. The subject matter of all of the foregoing is incorporated herein by reference in its entirety.

BACKGROUND

Field

This invention relates generally to information organization, search, and retrieval and more particularly to time series data organization, search, and retrieval.

Description of the Related Art

Time series data are sequences of time stamped records occurring in one or more usually continuous streams, representing some type of activity made up of discrete events. Examples include information processing logs, market transactions, and sensor data from real-time monitors (supply chains, military operation networks, or security systems). The ability to index, search, and present relevant search results is important to understanding and working with systems emitting large quantities of time series data.

Existing large scale search engines (e.g., Google and Yahoo web search) are designed to address the needs of less time sensitive types of data and are built on the assumption that only one state of the data needs to be stored in the index repository, for example, URLs in a Web search index, records in a customer database, or documents as part of a file system. Searches for information generally retrieve only a single copy of information based on keyword search terms: a collection of URLs from a Website indexed a few days ago, customer records from close of business yesterday, or a specific version of a document.

In contrast, consider an example of time series data from a typical information processing environment, shown in FIG. 1. Firewalls, routers, web servers, application servers and databases constantly generate streams of data in the form of events occurring perhaps hundreds or thousands of times per second. Here, historical data value and the patterns of data behavior over time are generally as important as current data values. Existing search solutions generally have little notion of time-based indexing, searching or relevancy in the presentation of results and don't meet the needs of time series data.

Compared to full text search engines, which organize their indices so that retrieving documents with the highest relevance scores is most efficient, an engine for searching time series data preferably would organize the index so that access to various time ranges, including less recent time ranges, is efficient. For example, unlike for many modern search engines, there may be significantly less benefit for a time series search engine to cache the top 1000 results for a particular keyword.

On the other hand, given the repetitive nature of time series data, opportunities for efficiency of index construction and search optimization are available. However, indexing time series data is further complicated because the data can be collected from multiple, different sources asynchronously and out of order. Streams of data from one source may be seconds old and data from another source may be interleaved with other sources or may be days, weeks, or months older than other sources. Moreover, data source times may not be in sync with each other, requiring adjustments in time offsets post indexing. Furthermore, time stamps can have an almost unlimited number of formats making identification and interpretation difficult. Time stamps within the data can be hard to locate, with no standard for location, format, or temporal granularity (e.g., day, hour, minute, second, sub-second).

Searching time series data typically involves the ability to restrict search results efficiently to specified time windows and other time-based metadata such as frequency, distribution of inter-arrival time, and total number of occurrences or class of result. Keyword-based searching is generally secondary in importance but can be powerful when combined with time-based search mechanisms. Searching time series data requires a whole new way to express searches. Search engines today allow users to search by the most frequently occurring terms or keywords within the data and generally have little notion of time based searching. Given the large volume and repetitive characteristics of time series data, users often need to start by narrowing the set of potential search results using time-based search mechanisms and then, through examination of the results, choose one or more keywords to add to their search parameters. Timeframes and time-based metadata like frequency, distribution, and likelihood of occurrence are especially important when searching time series data, but difficult to achieve with current search engine approaches. Try to find, for example, all stories referring to the "Space Shuttle" between the hours of 10 AM and 11 AM on May 10, 2005 or the average number of "Space Shuttle" stories per hour the same day with a Web-based search engine of news sites. With a focus on when data happens, time-based search mechanisms and queries can be useful for searching time series data.

Some existing limited applications of time-based search exist in specific small-scale domains. For example, e-mail search is available today in many mainstream email programs and web-based email services. However, searches are limited to simple time functions like before, after, or time ranges; the data sets are generally small scale and highly structured from a single domain; and the real-time indexing mechanisms are append only, usually requiring the rebuilding of the entire index to interleave new data.

Also unique to the cyclicality of time series data is the challenge of presenting useful results. Traditional search engines typically present results ranked by popularity and commonality. Contrary to this, for time series data, the ability to focus on data patterns and infrequently occurring, or unusual results may be important. To be useful, time series search results preferably would have the ability to be organized and presented by time-based patterns and behaviors. Users need the ability to see results at multiple levels of granularity (e.g., seconds, minutes, hours, days) and distribution (e.g., unexpected or least frequently occurring)

and to view summary information reflecting patterns and behaviors across the result set. Existing search engines, on the other hand, generally return text results sorted by key word density, usage statistics, or links to or from documents and Web pages in attempts to display the most popular results first.

In one class of time series search engine, it would be desirable for the engine to index and allow for the searching of data in real-time. Any delay between the time data is collected and the time it is available to be searched is to be minimized. Enabling real-time operation against large, frequently changing data sets can be difficult with traditional large-scale search engines that optimize for small search response times at the expense of rapid data availability. For example, Web and document search engines typically start with a seed and crawl to collect data until a certain amount of time elapses or a collection size is reached. A snapshot of the collection is saved and an index is built, optimized, and stored. Frequently accessed indices are then loaded into a caching mechanism to optimize search response time. This process can take hours or even days to complete depending on the size of the data set and density of the index. Contrast this with a real-time time series indexing mechanism designed to minimize the time between when data is collected and when the data is available to be searched. The ability to insert, delete and reorganize indices, on the fly as data is collected, without rebuilding the index structure is essential to indexing time series data and providing real-time search results for this class of time series search engines.

Other software that is focused on time series, e.g., log event analyzers such as Sawmill or Google's Sawzall can provide real-time analysis capabilities but are not search engines per se because they do not provide for ad hoc searches. Reports must be defined and built in advance of any analysis. Additionally, no general keyword-based or time-based search mechanisms are available. Other streaming data research projects (including the Stanford Streams project and products from companies like StreamBase Systems) can also produce analysis and alerting of streaming data but do not provide any persistence of data, indexing, time-based, or keyword-based searching.

There exists, therefore, a need to develop other techniques for indexing, searching and presenting search results from time series data.

SUMMARY

Methods and apparatus consistent with the invention address these and other needs by allowing for the indexing, searching, and retrieval of time series data using a time series search engine (TSSE). In one implementation, one aspect of TSSEs is the use of time as a primary mechanism for indexing, searching, and/or presentation of search results. A time series search language (TSSL) specific to time-based search mechanisms is used to express searches in human readable form and results are presented using relevancy algorithms specific to time series data. Search expression and results presentation are based on key concepts important to searching time series data including but not limited to time windows, frequency, distribution, patterns of occurrences, and related time series data points from multiple, disparate sources.

In one aspect of the invention, multiple sources of time series data are organized and indexed for searching and results are presented upon user or machine initiated searches. In another aspect, a time series search engine (TSSE) includes four parts: (1) a time stamp process; (2) an indexing process; (3) a search process; and (4) a results presentation process.

In one aspect of the invention, a computer-implemented method for time searching data includes the following steps. Time series data streams are received. One example of time series data streams includes server logs and other types of machine data (i.e., data generated by machines). The time series data streams are time stamped to create time stamped events. The time stamped events are time indexed to create time bucketed indices, which are used to fulfill search requests. Time series search request are executed, at least in part, by searching the time bucketed indices.

In certain implementations, time stamping the time series data streams includes aggregating the time series data streams into events and time stamping the events. For example, the events may be classified by domain and then time stamped according to their domain. In one approach, for events that are classified in a domain with a known time stamp format, the time stamp is extracted from the event. However, for events that are not classified in a domain with a known time stamp format, the time stamp is interpolated.

In another aspect of the invention, time bucketed indices are created by assigning the time stamped events to time buckets according to their time stamps. Different bucket policies can be used. For example, the time buckets may all have the same time duration, or may have different time durations. In addition, time buckets may be instantiated using a lazy allocation policy. The time stamped events may also be segmented, and the segments used to determine time bucket indices. Various forms of indexing, including hot indexing, warm indexing and speculative indexing, may also be used.

The creation of time bucket indices facilitates the execution of time series searches. In one approach, a time series search request is divided into different sub-searches for the affected time buckets, with each sub-search executed across the corresponding time bucket index.

Other aspects of the invention include software, computer systems and other devices corresponding to the methods described above, and applications for all of the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
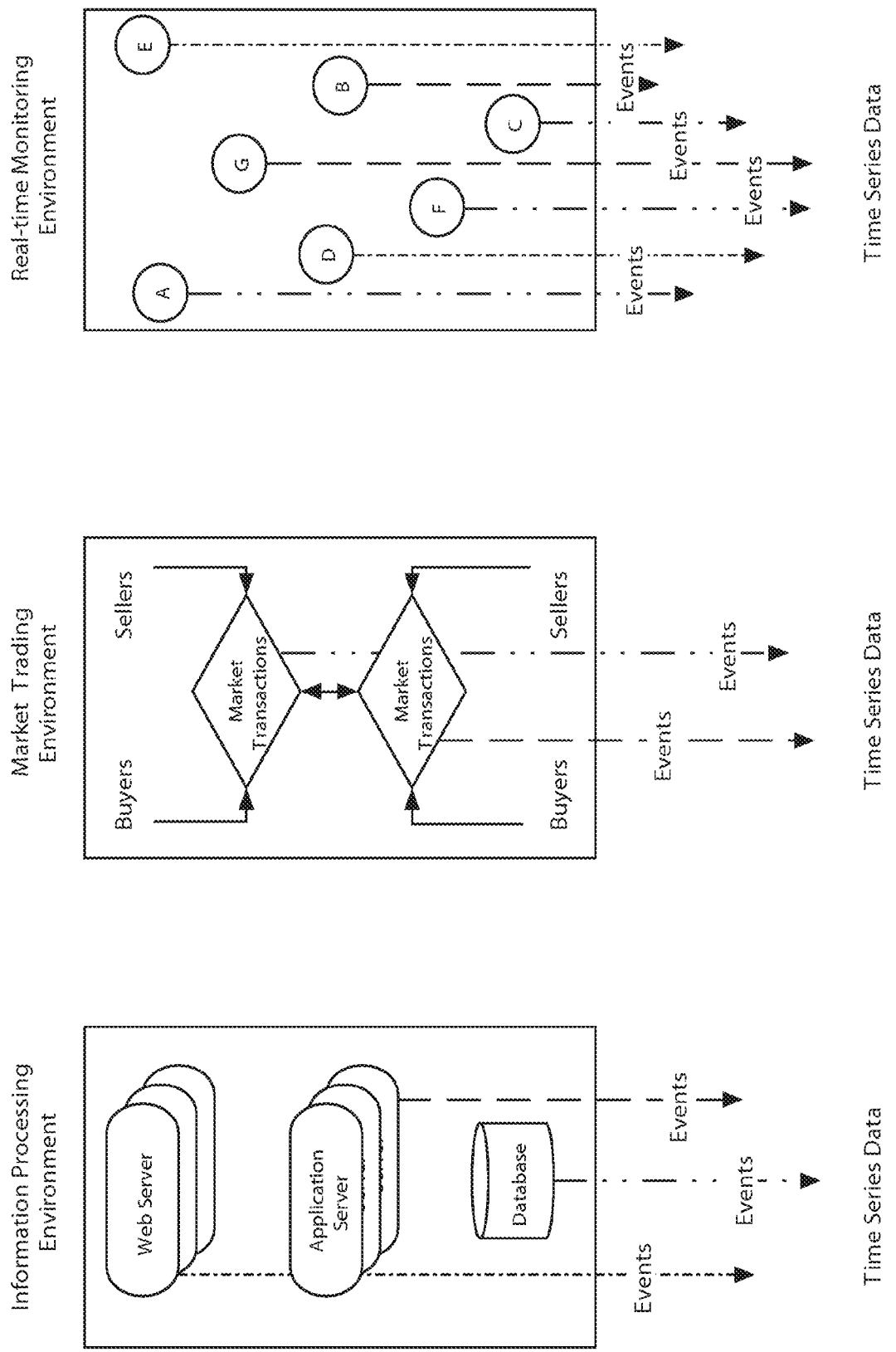
FIG. 1 (prior art) is a diagram of time series data environments.

FIG. 1 illustrates different examples of time series data environments with potentially large numbers of data sources and streams of time series data across multiple domains. In this figure, the first picture represents an information-processing environment with time series data from web servers, application servers, and databases in the form of server logs. The second picture is a typical market-trading environment with transactions between multiple buyers and sellers and between two or more markets. Time series data is generated in the form of transaction records representing the intention or trade or the final settlement of the trade as examples. In the third picture, a real-time monitoring environment is depicted with multiple sensors producing time series data in the form of recorded measurements. All three of these environments are examples of potential applications for the TSSE.

Aspects of the invention will be described with respect to the first picture in FIG. 1, the information-processing environment, but the invention can also be used with other time series data environments and applications including the other environments shown in FIG. 1.

Figure 2:
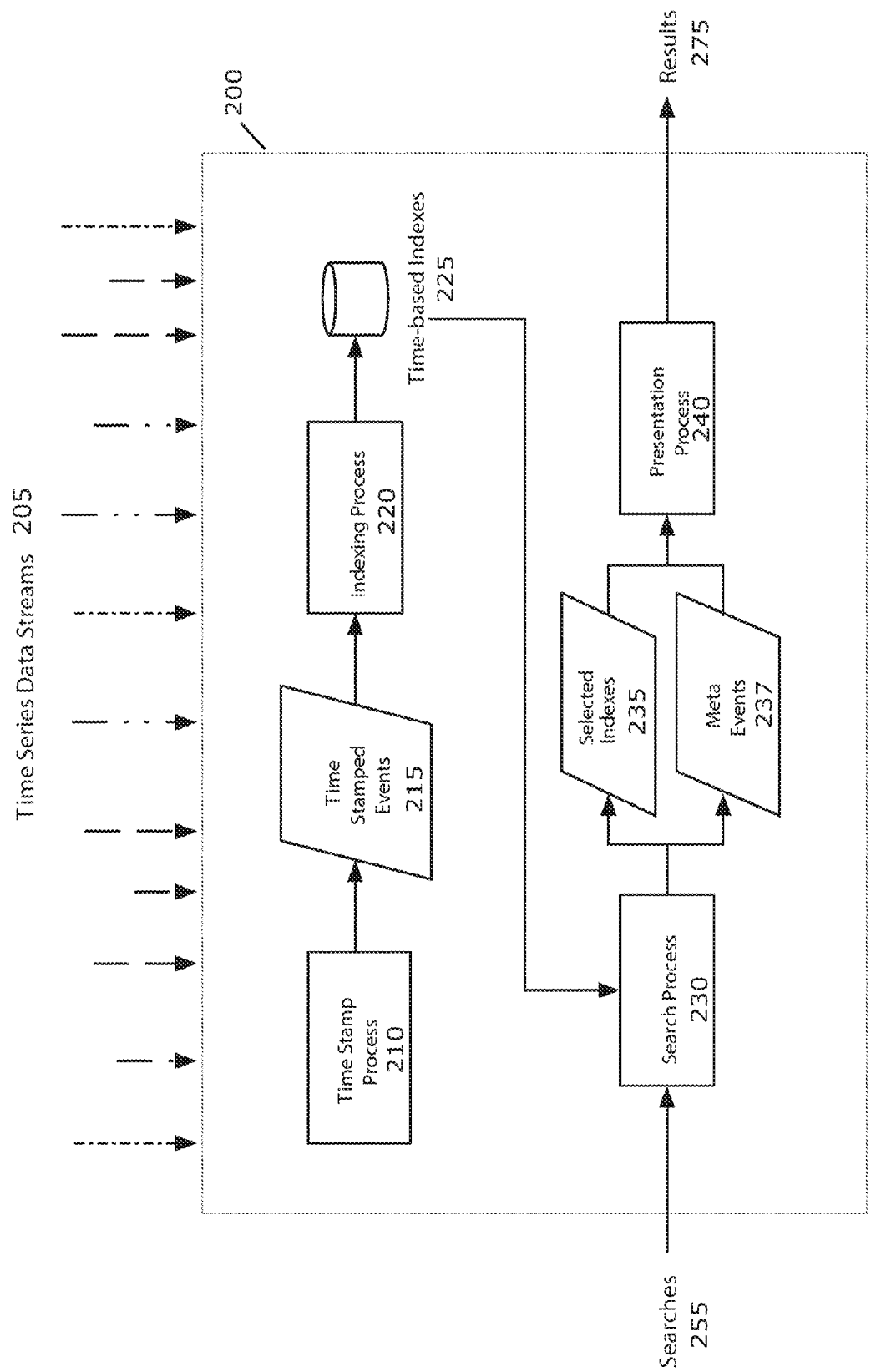
FIG. 2 is a diagram of a time series search engine according to the invention.

FIG. 2 illustrates one approach 200 to architecting a TSSE. Time series data streams 205 arrive synchronously or asynchronously from multiple sources, multiple searches 255 are expressed by users and/or other systems, and results sets 275 are presented through a variety of mechanisms including, for example, application programming interfaces and web-based user interfaces.

The arrival of time series data streams 205 at the TSSE 200 can be effected by having the TSSE gather them directly or by having a user-supplied script collect, preprocess, and deliver them to a default TSSE collection point. This architecture preferably tolerates data arriving late and temporally out of order. Currently, most sources of time series data are not designed for sophisticated processing of the data, so the TSSE typically will collect or be fed raw time series data that are close to their native form. The TSSE can be situated in different locations so long as it has access to the time series data. For example, one copy of the TSSE can be run on a single central computer or multiple copies can be configured in a peer-to-peer set-up with each copy working on the same time series data streams or different time series data streams.

FIG. 2 depicts an example TSSE 200 with four major processes: time stamp process 210, index process 220, search process 230 and presentation process 240. The time stamp process 210 turns raw time series data 205 into time stamped events 215 to be fed to the indexing process 220. Following our information processing example, raw logs 205 from multiple web servers, application servers and databases might be processed by the time stamp process 210 to identify individual events 215 within the various log formats and properly extract time and other event data. The event data 215 is used by the index process 220 to build time bucketed indices 225 of the events. These indices 225 are utilized by the search process 230 which takes searches 255 from users or systems, decomposes the searches, and then executes a search across a set of indices.

For example, a user might want to locate all the events from a particular web server and a particular application server occurring within the last hour and which contain a specific IP address. In addition, the search process 230 may choose to initiate the creation of meta events 237 at search time to handle time-based and statistical summary indices useful in searching through repetitive, temporal data. For example, meta events 237 may represent averages, means, or counts of actual events or more sophisticated pattern based behavior. In this case a user might want to search to find all the events occurring with a frequency of three per minute.

Upon completion, the search process 230 hands results from the selected indices 235 to the presentation process 240 which merges result sets, ranks results, and feeds the results 275 to an API or user interface for presentation.

Time Stamp Process

Figure 3:
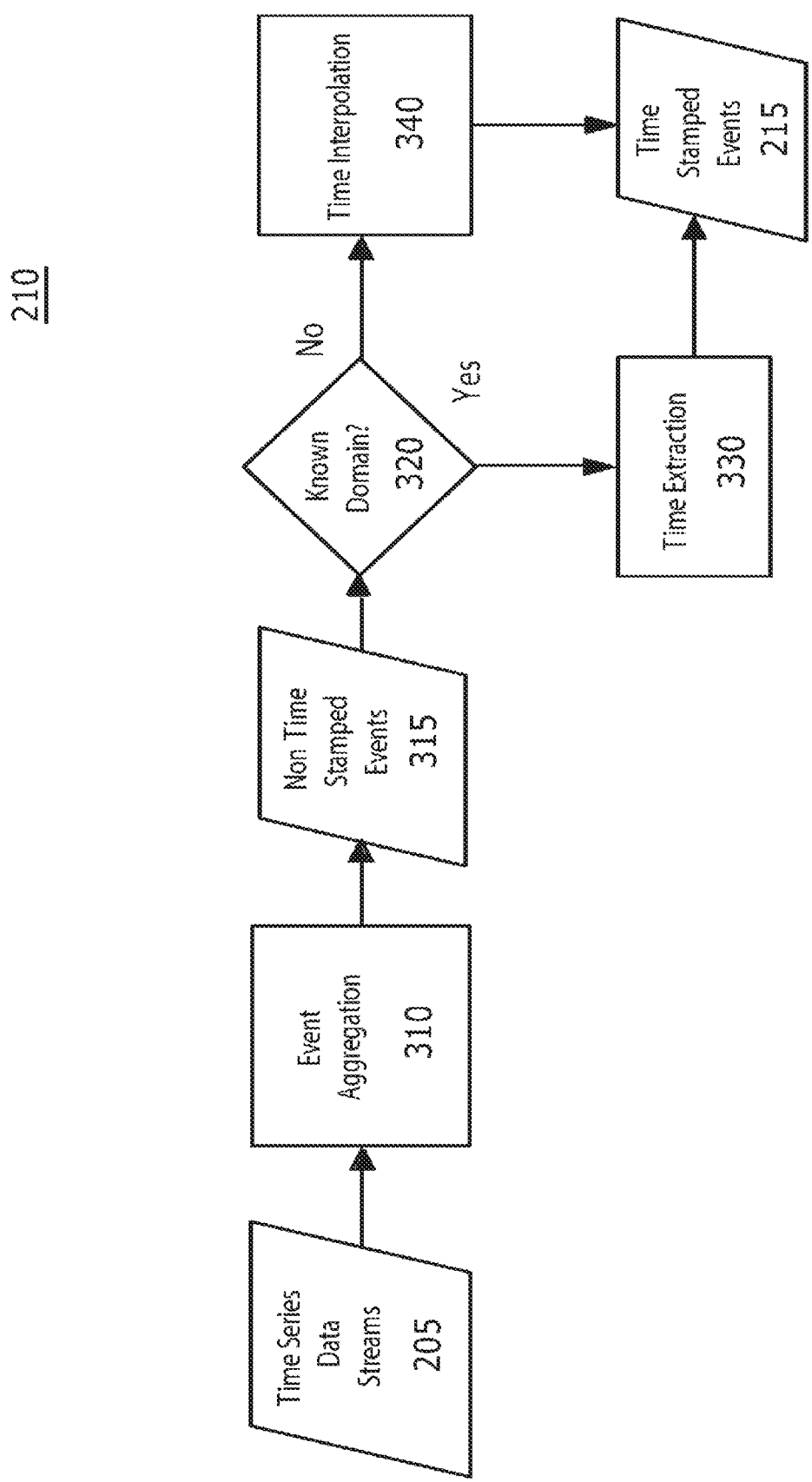
FIG. 3 is a diagram of a time stamp process suitable for use with the time series search engine of FIG. 2.

Process 210 shown in FIG. 2 of an exemplary implementation 200 of a TSSE is to acquire streaming time series data, identify individual events within the stream, and assign time stamps to each event. An example time stamp process 210 block diagram is shown in FIG. 3 and includes several steps including event aggregation 310, domain identification 320, time extraction 330, and time interpolation 340. Time series data streams 205 are received as input to the time stamp process 210 and then processed into individual time stamped events 215.

Event Aggregation

Step 310 in the time stamp process 210 of FIG. 3 aggregates the streaming time series data 205 into individual events 315. In our information-processing example, web server time series data streams may have a single line per event and be easy to identify. However, an application server time series data stream may contain single events with a large number of lines making identification of individual events within the stream difficult.

Figure 4:
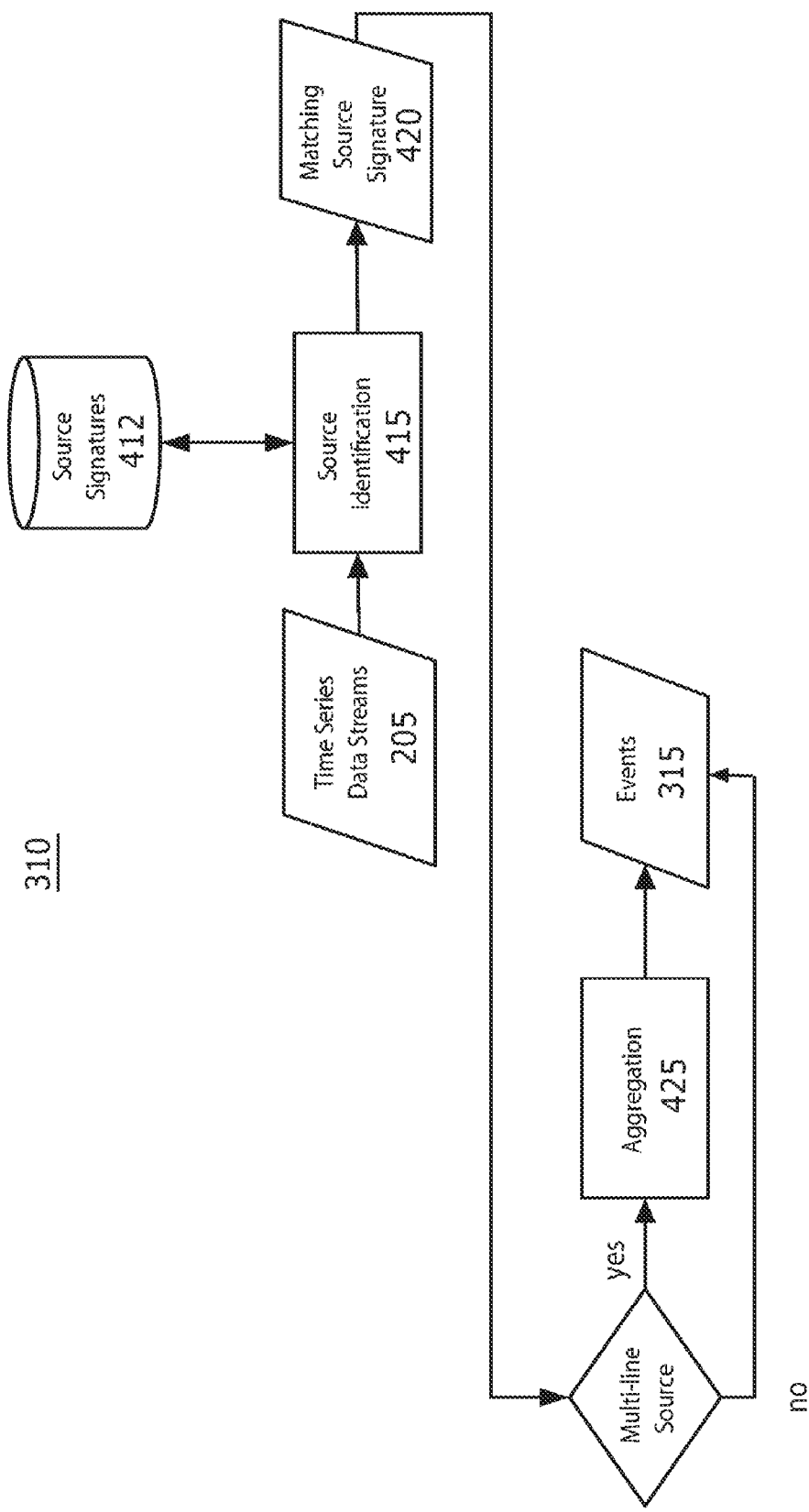
FIG. 4 is a diagram of an event aggregation process suitable for use with the time stamp process of FIG. 3.

In one implementation, event aggregation 310 uses feature extraction (e.g., leading punctuation, significant words, white space, and breaking characters) and machine learning algorithms to determine where the event boundaries are. FIG. 4 is a diagram of an event aggregation process suitable for use with the time stamp process of FIG. 3.

Source Identification—Classification into Domains

Given the repetitive, yet dynamic, nature of the time series data 205 in our information processing example (which data will be referred to as machine data 205 or MD 205), an effective aggregation process 310 (such as shown in FIG. 4) preferably will learn about data formats and structure automatically. In one implementation, learning is separated into different domains based on the source of MD 205. Domains can be general system types, such as log files, message bus traffic, and network management data, or specific types, such as output of a given application or technology—Sendmail logging data, Oracle database audit data, and J2EE messaging.

In this example event aggregation process 310, the domain for a given source of MD is identified 415 so that domain specific organization methods can be applied. Domains are determined through a learning process. The learning process uses collections of MD from well-known domains as input and creates a source signature 412 for each domain. In one implementation, source signatures 412 are generated from representative samples of MD 205 by creating a hash table mapping punctuation characters to their frequency. While tokens and token values can change in MD collection, in this particular implementation, the signature 412 generated by the frequency of punctuation is quite stable, and reliable within a specific domain. Other implementations could use functions of the punctuation and tokens, such as the frequencies of the first punctuation character on a line, or the first capitalized term on a line. Given that source signatures 412 can be large and hard to read, signatures can have a corresponding label in the form of a number or text that can be machine generated or human assigned. For example, the source signature 412 for an Apache web server log might be programmatically assigned the label "205", or a user can assign the label "Apache Server Log".

In one embodiment, clustering is used to classify 415 collected MD 205 into domains according to their source signatures 412. As collections of MD 205 are encountered, each collection's signature is matched to the set of known source signatures 412 by performing a nearest-neighbor search. If the distance of the closest matching signature 412 is within a threshold, the closest matching signature 420's domain is assumed to be the domain of the source. If no best match can be found, a new source signature 412 can be created from the sample signature and a new source domain created. Alternatively, a default source domain can be used. In one implementation, the distance between two signatures is calculated by iterating over the union of attributes of the two signatures, with the total signature distance being the average of distances for each attribute. For each attribute A, the value of A on Signature1 and Signature2, V1 and V2, are compared and a distance is calculated. The distance for attribute A is the square of (V1−V2)*IDF, where IDF is the $\log(N/|A|)$, where N is the number of signatures, and $|A|$ is the number of signatures with attribute A.

Source Identification—Classification as Text/Binary

Some MD 205 sources are non-textual or binary and cannot be easily processed unless a known process is available to convert the binary MD into textual form. To classify a source as textual or binary, a sample MD collection is analyzed. Textual MD can also have embedded binary MD, such as a memory dump, and the classification preferably identifies it as such. In one implementation, the textual/binary classification works as follows. The sample is a set of lines of data, where a line is defined as the data between new lines (i.e., '\n'), carriage returns (i.e., '\r'), or their combination (i.e., '\r\n'). For each line, if the line's length is larger than some large threshold, such as 2 k characters, or if the line contains a character with an ASCII value of zero (0), a count of Binary-looking lines is incremented. Otherwise, if the line's length is shorter than a length that one would expect most text lines to be below, such as 256 characters, a count of Text-looking lines is incremented. If the number of Text-looking lines is twice as numerous as the Binary-looking lines (other ratios can be used depending on the context), the source is classified as text. Otherwise, the source is classified as binary.

Aggregation of Machine Data into Raw Events

When the source signature 420 for a collection of MD has been identified 415, the corresponding aggregation rules are applied 425 to the MD collection. Aggregation rules describe the manner in which MD 205, from a particular domain, is organized 425 into event data 315 by identifying the boundaries of events within a collection of MD, for example, how to locate a discrete event by finding its beginning and ending. In one implementation, the method of aggregation 425 learns, without prior knowledge, by grouping together multiple lines from a sample of MD 205. Often MD 205 contains events 315 that are anywhere from one to hundreds of lines long that are somehow logically grouped together.

The MD collection may be known a priori, or may be classified, as single-line type (i.e., containing only single-line events) or multi-line type (i.e., possibly containing multi-line events) prior to performing aggregation. For those MD collections that are classified as single line type, aggregation 425 is simple—single-line type MD collections are broken on each line as a separate event. Multi-line type MD collections are processed 425 for aggregation. In one implementation, a MD collection is classified as a multi-line type if 1) there is a large percentage of lines that start with spaces or are blank (e.g., if more than 5% of the lines start with spaces or are blank), or 2) there are too many varieties of punctuation characters in the first N punctuation characters. For example, if the set of the first three punctuation characters found on each line has more than five patterns (e.g., ':::', '!:!', ',,,', ':..', '( )*'), the collection might be classified as multi-line.

Another aspect of aggregation methods 425 is the ability to learn, and codify into rules, what constitutes a break between lines and therefore the boundary between events, by analyzing a sample of MD. For example, in one implementation, an aggregation method 425 compares every two-line pair looking for statistically similar structures (e.g., use of white space, indentation, and time-stamps) to quickly learn which two belong together and which two are independent. In one implementation, aggregation 425 works as follows. For each line, first check if the line starts with a time-stamp. If so, then break. Typically, lines starting with a time-stamp are the start of a new event. For lines that do not start with a time-stamp, combine the current line with the prior line to see how often the pair of lines occurs, one before the other, as a percentage of total pairs in the MD sample. Line signatures are used in place of lines, where a line signature is a more stable version of a line, immune to simple numeric and textual changes. In this implementation, signatures can be created by converting a line into a string that is the concatenation of leading white space, any punctuation on the line, and the first word on the line. The line "10:29:03 Host 191.168.0.1 rebooting:normally" is converted to ":: . . . :Host."

Now this current line signature can be concatenated with the previous line signature (i.e., signature1 combined with signature2) and used as a combined key into a table of break rules. The break rule table maps the combined key to a break rule, which determines whether there should be a 'break', or not, between the two lines (i.e., whether they are part of different events or not). Break rules can have confidence levels, and a more confident rule can override a less confident rule. Break rules can be created automatically by analyzing the co-occurrence data of the two lines and what percent of the time their signatures occur adjacently. If the two line signatures highly co-occur, a new rule would recommend no break between them. Alternatively, if they rarely co-occur, a new rule would recommend a break between them. For example, if line signature A is followed by line signature B greater than 20% of the time A is seen, then a break rule might be created to recommend no break between them. Rules can also be created based on the raw number of line signatures that follow/proceed another line signature. For example, if a line signature is followed by say, ten different line signatures, create a rule that recommends a break between them. If there is no break rule in the break rule table, the default behavior is to break and assume the two lines are from different events. Processing proceeds by processing each two-line pair, updating line signature and co-occurrence statistics, and applying and learning corresponding break rules. At regular intervals, the break rule table is written out to the hard disk or permanent storage.

Time Stamp Identification

Once the incoming time series stream 205 has been aggregated 310 into individual events 315, the events and their event data are input into a time stamp identification step 320 which determines whether or not the time series event data contains tokens that indicate a match to one of a collection of known time stamp formats. If so, the event is considered to have a time stamp from a known domain and extraction 330 is performed. Otherwise, interpolation 340 is performed.

Time Stamp Extraction

If a known domain has been identified for an event, the event 315 is taken as input to a time stamp extraction step 330 where the time stamp from the raw event data is extracted and passed with the event to the indexing process 220. In an exemplary implementation, this timestamp extraction 330 occurs by iterating over potential time stamp format patterns from a dynamically ordered list in order to extract a time to be recorded as the number of seconds that have passed since the Unix epoch (0 seconds, 0 minutes, 0 hour, Jan. 1, 1970 coordinated universal time) not including leap seconds. Additionally, the implementation takes into account time zone information and normalizes the times to a common offset. To increase performance, the ordering of this list is determined using a move-to-front algorithm, wherein whenever a match is found the matching pattern is moved to the beginning of the list. In such an implementation, the most frequently occurring patterns are checked earliest and most often, improving performance. The move-to-front lists may be maintained either for all time series data sources together, on a per-source basis (to take advantage of the fact that the formats in a single source are likely to be similar), or in some other arrangement.

Time Stamp Interpolation

In the case where the event did not contain a time stamp from a known domain, then a timestamp is assigned to the event based on its context. In one implementation, the time stamp is linearly interpolated 340 from the time stamps of the immediately preceding and immediately following events 315 from the same time series data stream. If these events also contain no time stamps from a known domain, further earlier and/or later events can be used for the interpolation. The time stamp extraction module 330 automatically stores the time stamp of every hundredth event (or some other configurable period) from each time series data stream in order to facilitate time stamp interpolation 340. In another implementation, time stamps are interpolated 340 based on the time associated with the entire time series data stream 205 including acquisition time, creation time or other contextual meta time data.

Indexing Process

Figure 5:
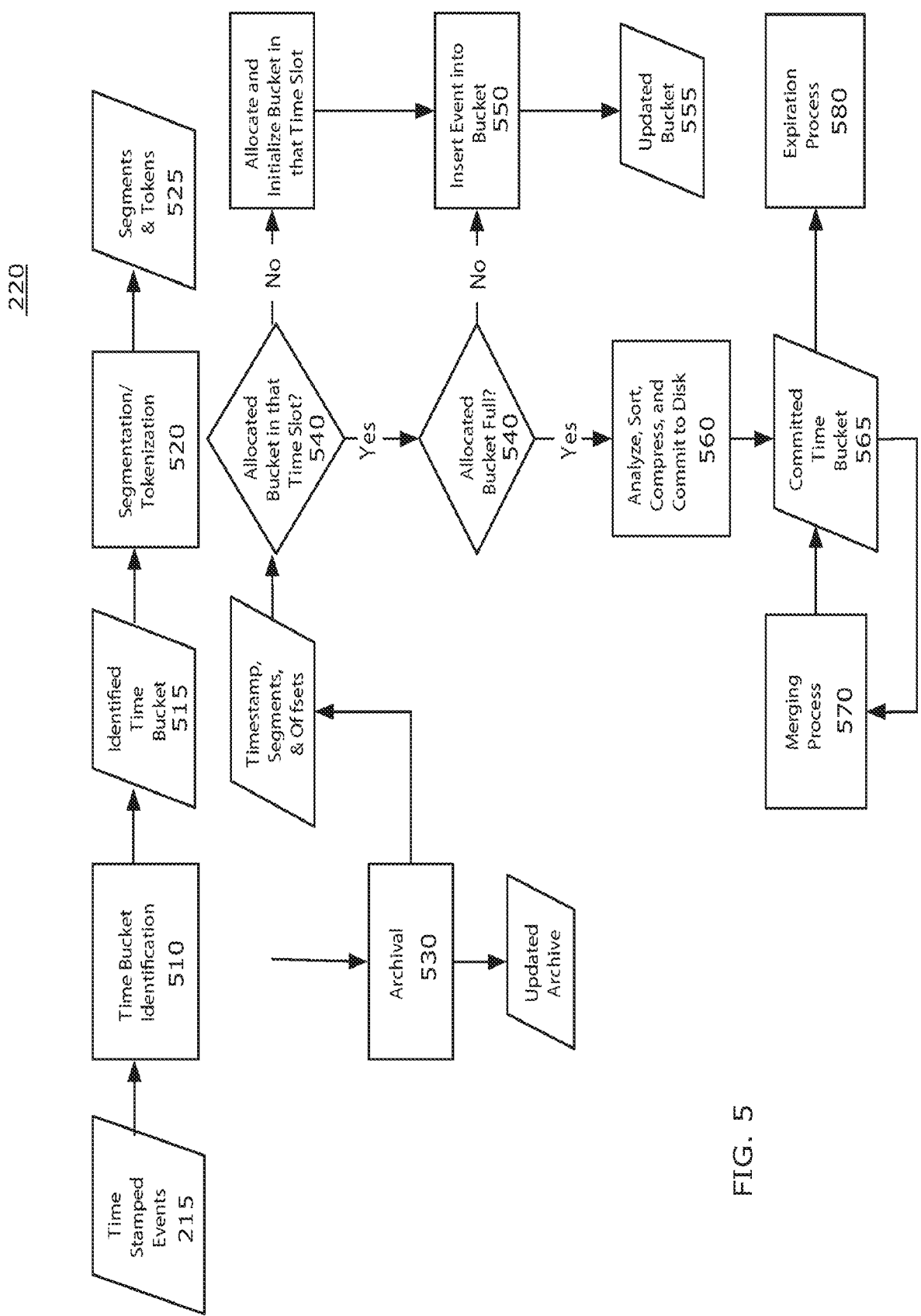
FIG. 5 is a diagram of an indexing process suitable for use with the time series search engine of FIG. 2.

Returning to FIG. 2, in the indexing process 220, indexes are created based on incoming event data 215. The indexing process 220 organizes and optimizes the set of indices in an online fashion as they are extended with more events. An example TSSE indexing process 220 is shown in FIG. 5 and includes, in one implementation, several steps including bucketing 510, segmenting 520, archival 530, allocation 540, insertion 550, committing to secondary storage 560, merging buckets in secondary storage 570, and expiring buckets in secondary storage 580.

Time Bucketing

Events indexed by the TSSE are often queried, updated, and expired using time-based operators. By hashing the components of the index over a set of buckets organized by time, the efficiency and performance of these operators can be significantly improved. The final efficiency of the bucketing will, of course, depend on the hardware configuration, the order in which the events arrive, and how they are queried, so there is not a single perfect bucketing policy.

In one implementation, buckets with a uniform extent are used. For example, each time bucket can handle one hour's worth of data. Alternate policies might vary the bucket extents from one time period to another. For example, a bucketing policy may specify that the buckets for events from earlier than today are three hour buckets, but that the buckets for events occurring during the last 24 hours are hashed by the hour. In the information processing example, a bucket might cover the period Jan. 15, 2005 12:00:00 to Jan. 15, 2005 14:59:59. In order to improve efficiency further, buckets are instantiated using a lazy allocation policy (i.e., as late as possible) in primary memory (i.e., RAM). In-memory buckets have a maximum capacity and, when they reach their limit, they will be committed to disk and replaced by a new bucket. Bucket storage size is another element of the bucketing policy and varies along with the size of the temporal extent. Finally, bucket policies typically enforce that buckets (a) do not overlap, and (b) cover all possible incoming time stamps.

Step 510 in indexing an event by time is to identify the appropriate bucket for the event based on the event's time stamp and the index's bucketing policy. Each incoming event 215 is assigned 510 to the time bucket where the time stamp from the event matches the bucket's temporal criteria. In one implementation, we use half-open intervals, defined by a start time and an end time where the start time is an inclusive boundary and the end time is an exclusive boundary. We do this so that events occurring on bucket boundaries are uniquely assigned to a bucket. Following our example in the information processing environment, a database server event with the time stamp of Jan. 15, 2005 12:00:01 might be assigned to the above-mentioned bucket.

Segmentation

Once an appropriate bucket has been identified 510 for an event, the raw event data is segmented 520. A segment (also known as a token) is a substring of the incoming event text and a segmentation 520 is the collection of segments implied by the segmentation algorithm on the incoming event data. A segment sub string may overlap another substring, but if it does, it must be contained entirely within that substring. We allow this property to apply recursively to the containing substring, so that the segment hierarchy forms a tree on the incoming text.

In one implementation, segmentation 520 is performed by choosing two mutually exclusive sets of characters called minor breakers and major breakers. Whenever a breaking character, minor or major, is encountered during segmentation of the raw data, segments are emitted corresponding to any sequence of bytes that has at least one major breaker on one end of the sequence. For example, if, during segmentation, a minor breaking character is found, then a segment corresponding to the sequence of characters leading from the currently encountered minor breaker back to the last major breaker encountered is recorded. If a major breaker was encountered, then the sequence of characters leading back to either the last major breaker or the last minor breaker, whichever occurred most recently, determines the next segment to be recorded.

Segmentation 520 rules describe how to divide event data into segments 525 (also known as tokens). In one implementation a segmentation rule examines possible separators or punctuation within the event, for example, commas, spaces or semicolons. An important aspect of segmentation is the ability to not only identify individual segments 525, but also to identify overlapping segments. For example, the text of an email address, "bob.smith@corp.com", can be broken into individual and overlapping segments; <bob.

smith>, <@> and <corp.com> can be identified as individual segments, and <<bob.smith><@><corp.com>> can also be identified as an overlapping segment. As described above, in one implementation, segmentation 520 uses a two-tier system of major and minor breaks. Major breaks are separators or punctuation that bound the outer most segment 525. Examples include spaces, tabs, and new lines. Minor breaks are separators or punctuation that break larger segments into sub segments, for example periods, commas, and equal signs. In one implementation, more complex separators and punctuation combinations are used to handle complex segmentation tasks 520, for example handling Java exceptions in an application server log file.

An example of segmentation in our information-processing example, IP addresses could be broken down using white space as major breakers and periods as minor breakers. Thus, the segments for the raw text "192.168.1.1" could be:

"192"
"192.168"
"192.168.1"
"192.168.1.1"

In another implementation, certain segments may represent known entities that can be labeled and further understood algorithmically or by human added semantics. For example, in the above representation, "192.168.1.1" may be understood to be an IP address. Named entity extraction can be algorithmically performed in a number of ways. In one implementation, the segment values or segment form from the same segment across multiple events is compared to an entity dictionary of known values or known forms.

In another implementation, entity extraction techniques are used to identify semantic entities within the data. In one implementation, search trees or regular expressions can be applied to extract and validate, for example, IP addresses or email addresses. The goal of extraction is to assist the segmentation process 520 and provide semantic value to the data.

Archiving and Indexing Events

At this point in the process, incoming events have time stamps 215, segments 525, and a time bucket 515 associated with them. To create the persistent data structures that will be used later to perform lookups in the search process, we store the raw data of the event with its segmentation, create indices that map segments and time stamps to offsets in the event data store, and compute and store metadata related to the indices.

Because the TSSE tolerates, in near real time, both the arrival of new events and new searches, the system preferably is careful in managing access to disk. For the indexes, this is accomplished by splitting index creation into two separate phases: hot indexing and warm indexing. Hot indexes are managed entirely in RAM, are optimized for the smallest possible insert time, are not searchable, and do not persist. "Warm" indexes are searchable and persistent, but immutable. When hot indexes need to be made searchable or need to be persistent, they are converted into warm indexes.

In the implementation shown in FIG. 5, a hot index 555 contains a packed array of segments, a packed array of event addresses and their associated time stamps, and a postings list that associates segments with their time stamped event addresses. For performance reasons, the packed arrays can have hash tables associated with them to provide for quick removal of duplicates. When incoming events are being indexed, each segment of the event is tested for duplication using the segment array and its associated hash. The event address is also tested for duplication, against the event address array and its associated hash. If either of the attributes is a duplicate, then the instance of that duplicate that has already been inserted into the packed array is used. Otherwise, the new segment or event address is copied into the appropriate table 550 and the associated hash table is updated. As events are inserted into the hot index, the space associated with each of the packed arrays gets used. A hot slice is considered to be "at capacity" when one of its packed arrays fills up or when one of its hash tables exceeds a usage threshold (e.g., if more than half of the hash table is in use). Once a hot index reaches capacity 540, it cannot accept more segments for indexing. Instead it is converted to a warm index, committed to disk 560, and replaced with a new empty hot index.

Another feature of this particular system is speculative indexing. Based on earlier indexing processes, new time buckets can be initialized using all or part of a representative, completed bucket as an exemplar. In other words, by keeping around copies of data that may reasonably be expected to occur in a time bucket, we can improve indexing performance by speculatively initializing parts of the hot index. In one embodiment, the speculative indexing is performed by copying the packed array of segments and its associated hash table from an earlier hot index. The hot slice is then populated as usual with the exception that the segment array is already populated and ready for duplicate testing. Because of the highly regular language and limited vocabulary of machines, the hit rate associated with this speculation can be very good.

The searching process (as described in the next section) allows the user to search on segments, segment prefixes, and segment suffixes. To accommodate these search types, in one implementation, the segments array can be sorted and then stored as a blocked front coded lexicon (hereafter called "the forward lexicon"). This data structure makes it possible to perform segment and segment prefix lookups efficiently while still achieving a reasonable amount of compression of the segment text. When a search is being performed on a particular segment, the offset of the segment in the forward lexicon is used as an efficient way to look up metadata associated with the queried-for segment in other associated tables.

To handle suffix lookups, a blocked front coded lexicon can be created on the same collection of segments after they have been string-reversed (hereafter called "the reverse lexicon"). Also, a map is populated that converts the offset of a reversed segment in the reverse lexicon to the equivalent non-reversed segment's offset in the forward lexicon (hereafter called "the reverse-forward map"). When performing suffix lookups, the offset in the reverse lexicon is used as an offset into the reverse-forward map. The value stored at that position in the map is the appropriate offset to use for the other metadata arrays in the warm index.

The warm index provides a list of event offsets for each segment indexed, preferably in an efficient manner. In one implementation, this can be done by maintaining an array of compressed postings lists and an associated array of offsets to the beginning of each of those compressed postings lists. The postings lists are maintained in segment offset order, so when a lookup is performed, the segment ID can be used to find the appropriate entry of the postings lists offsets array. The values in the postings lists entries are the offsets that should be used to look up events in the packed array of event addresses.

Finally, statistical metadata can be provided for each indexed segment (e.g., the first and last time of occurrence of the segment, the mean inter-arrival time, and the standard deviation of the inter-arrival time).

During the course of the indexing process, it is possible that a single time bucket will be filled and committed to disk 560 several times. This will result in multiple, independently searchable indices in secondary storage for a single time span. In an exemplary implementation, there is a merging process 570 that takes as input two or more warm indices and merges them into a single warm index for that time bucket. This is a performance optimization and is not strictly required for searching.

Expiring Events

Furthermore, over a long period of time, it is possible that applying the indexing process 220 to time series data will cause a large amount of persistent data to accumulate. The indexing process, therefore, preferably contains an expiration process 580 that monitors the database for time buckets to be deleted based on user-provided preferences. In one implementation, these preferences might include a trailing time window ("events older than 3 months need not be returned in search results"), a time range ("events earlier than January 1 of this year need not be returned in search results"), a maximum number of events ("no more than 1 million events need be returned in search results"), or a maximum total size for the index ("return as many useful search results as possible while consuming no more than 100 GB of Disk"). A process periodically wakes up and tests the collection of warm slices for any slices that meet the expiration criterion. Upon expiration, a warm index file and its associated raw event data and segmentation is moved out of the active index. The index file need not necessarily be deleted. In one implementation, the index file could be streamed to less expensive offline storage.

Search Process

Figure 6:
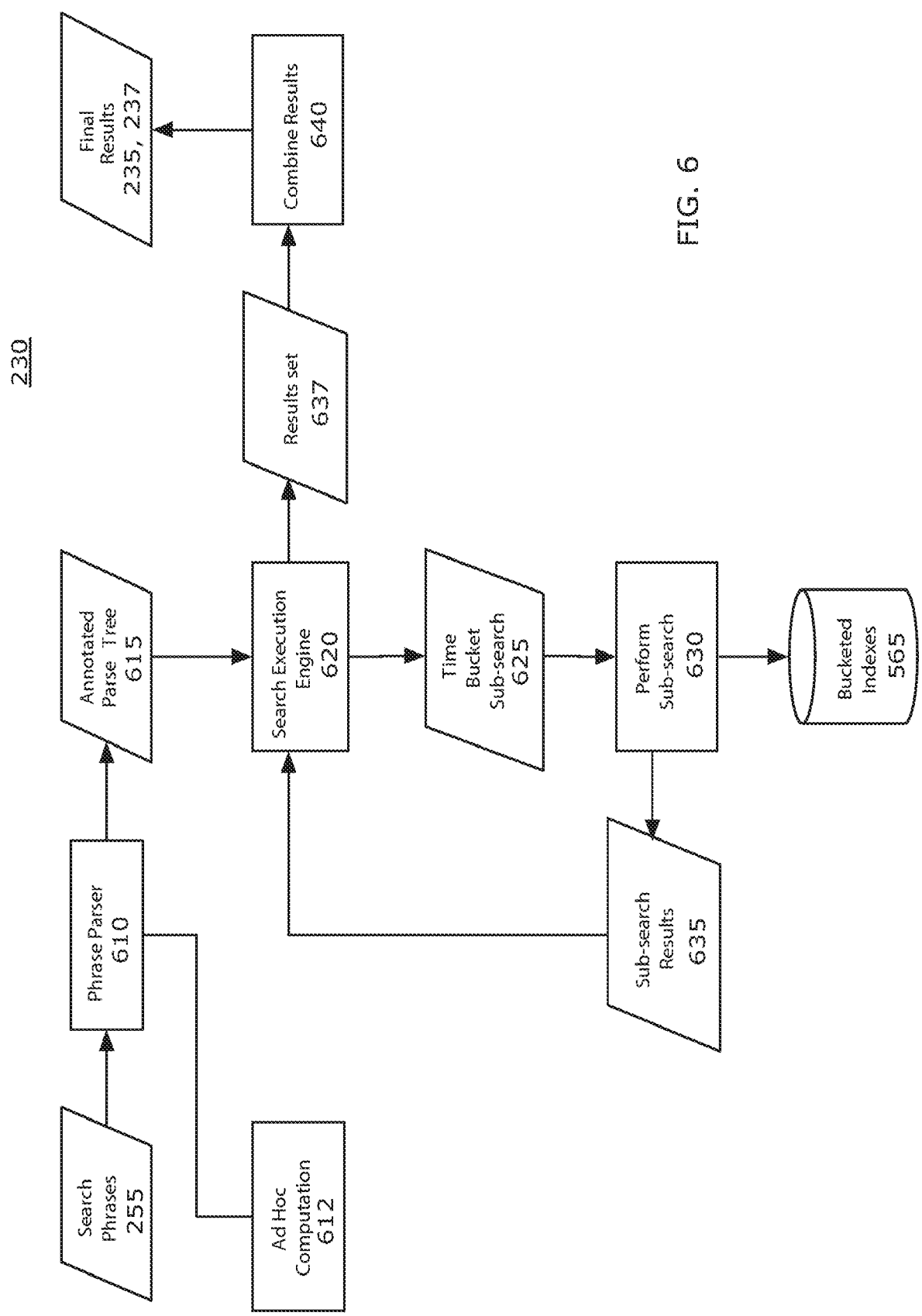
FIG. 6 is a diagram of a search process suitable for use with the time series search engine of FIG. 2.

An example TSSE search process is shown in FIG. 6 and includes several methods for parsing 610 a search phrase, issuing multiple sub-searches 625 in order to satisfy the incoming parent search, using sub-search results 635 to prune searches, and merging 640 sub-search results into a final set of search results for presentation to the user.

Time Series Search Language

During search processing, incoming search phrases 255 are parsed 610 according to a time series search language (TSSL) in order to generate annotated parse trees 615. An exemplary TSSL language syntax includes a series of modifiers or commands taking the format name::value. Some modifiers may have default values and some can only be used once, while some can appear several times in the same search with different values. Examples include the following:

average::value—calculate the average number of events using the value time frame.

page::value—present search results by value. Value can be seconds, minutes, hours, days, weeks or months or any other metadata element, for example, source or event type.

count::—calculate the total number of for events.

daysago::value—search for events within the last value days.

index::value—the index to search-main, default, history, or another index defined by the TSSE.

hoursago::value—search for events within the last value hours.

eventtype::value—search for events with an event type or tag that matches the specified value.

host::value—search for events whose hostname was set to the specified value. This is the host that logged the event, not necessarily the host that generated the event.

maxresults::value—the maximum number of results to return. minutesago::value—search for events within the last value minutes.

related::value—search for events with segment values (e.g., 404 or username) matching one or more in the current event.

similar::value—search for events with a similar event type to the current event.

sourcetype::value—search for events with a given source-type of value.

unexpected::value—search for events that lie outside observed patterns in the index by the specified value of 0 (expected) to 9 (most unexpected).

Modifiers can be combined with keywords, wildcard characters, literal strings, quoted phrases and Boolean operators, such as AND, OR, NOT. Parentheses can be used to nest search and sub-search phrases together. An example search phrase might be "sourcetype::mysql* sock* NOT (started OR (host::foo OR host::BAR)) maxresults::10 (eventtype::baddb OR eventtype::?8512-3) daysago::30".

In one implementation, a custom parser 610 handles the Boolean operators "NOT" and "OR" and defaults to "AND". This implementation also handles using parentheses to disambiguate the language when there are several operators. Otherwise, it associates left-to-right. The implementation also supports special search operators that are indicated using a domain specifier followed by a demarcation element. For example, searching for "source::1234", might indicate that the searcher (human or system) wants to restrict results to events that were received from a particular source ID.

Incoming search phrases may also trigger ad hoc computation 612 based on a map of special keywords. For example, a special search string might be used to indicate that a search is to be stored and reissued on a periodic basis or to request a list of sources. In this case, the search string would be stored in a table on disk along with a schedule specifying the schedule on which the search should be reissued. Depending on the results of the search when executed, additional actions may be triggered. For example, an email alert might be sent, an RSS feed might be updated, or a user-supplied script might be executed. Another example of a search that triggers ad hoc computation 612 is one that is indicated to be saved for later use, but not to be reissued on a periodic basis.

Assuming that the search parser 610 determined that an annotated syntax tree 615 should be created for the search string, the next component, the search execution engine 620 will use the annotated syntax tree 615 to issue sub-searches 625 to the time bucketed indices 565. Each sub-search 625 is targeted at an individual time bucket 565. Time buckets are queried in the order that is most advantageous to pruning given the sort order for the results. For example, if search results are sorted in reverse chronological order, then the sub-search for the most recent time bucket will be issued first. This allows the search execution engine 620 to examine the results 635 of the sub-search before proceeding with additional (expensive) sub-searches 625. For example, if a particular sub-search returns enough results 635, then it is not necessary to proceed with additional sub-searches 625.

Once enough results sets 637 have been accumulated to satisfy the parent search, another module will take the results and merge 640 them into a single result set 235, 237 that satisfies the search. This merging process, in one implementation, performs a merge sort on the results from each of the buckets to keep them in the order required for the presentation process.

Presentation Process

Figure 7:
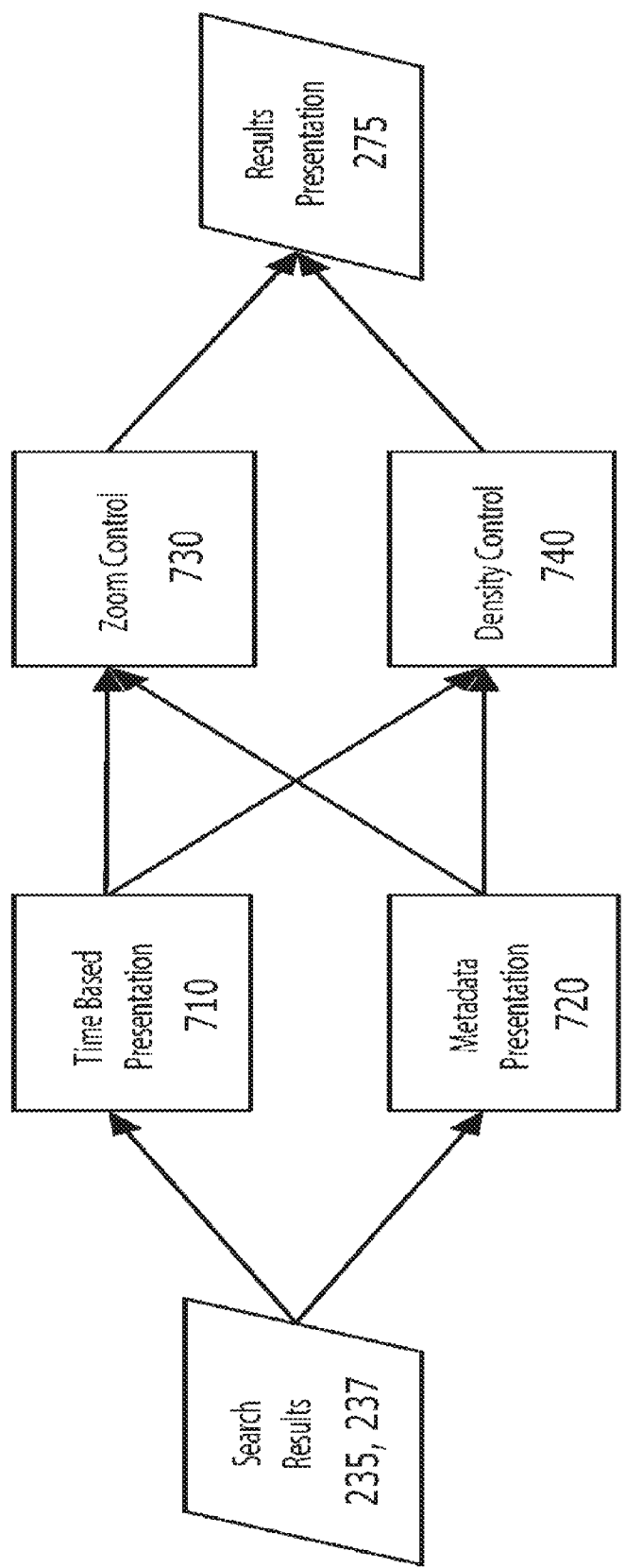
FIG. 7 is a diagram of a results presentation process suitable for use with the time series search engine of FIG. 2.

The final process in an exemplary implementation of our example TSSE is the preparation of search results for presentation 240, as shown in FIG. 7. Unlike current large-scale search engines that present non-interactive results ordered by keyword relevance ranking, this example TSSE can present results organized by time, event relationships, and keyword relevance ranking.

Time Based Presentation

Unique to the challenge of indexing and searching time series data is the presentation of results using time as a primary dimension 710. Because existing large-scale search engines do not organize information by time, the presentation of time-based results is not a consideration. However, a primary benefit of a TSSE is the ability to index, search and present time series data chronologically. Results can be presented by aggregating and summarizing search results based on discrete time ranges or based on statistical calculations.

For example, the example TSSL can specify to see results for only a particular time frame and/or to see results presented by seconds, minutes, hours, days, weeks or months. In this way the search window can be limited to a timeframe and the results can be constructed for optimal viewing based on the density of the expected result set returned from a search. The search "192.168.169.100 hoursago::24 page:: seconds", will return time series events including the keyword "192.168.169.100" that occurred within the last 24 hours and will summarize the display results by seconds. In an exemplary implementation of a TSSE, summarization can include both aggregated display lines summarizing the events for the summary window and/or paging the results by the summary window. In the example above, each page of the search results presentation may include one second in time. Examples include but are not limited to:

Ability to scroll/page through the data (n) results at a time by count.
  Ability to scroll/page through the data by time: next/ previous second, minute, hour, day, year.
  Ability to specify max count per timeframe.
  Ability to get next (n) results within a paged time frame— (within a second) get next 100.

Metadata Presentation

In addition to time-based presentation 710, an example TSSE preferably is able to present additional aggregation and summarization of results by metadata characteristics 720, such as, data source, data source type, event type, or originating host machine. In this way, results can be not only organized by time, but also refined by metadata aggregation and summarization. The search "192.168.169.100 page:: source" will present all the results with "192.168.169.100" and put each data source containing results on a separate page. Examples include but are not limited to:

Original physical location of the data source.
  Original physical machine, sensor etc. generating the data.
  Type of data source as dynamically assigned by the indexing process.
  Type of event as dynamically assigned by the indexing process.

Zoom Control

Because time and certain metadata parameters (e.g., machine IP addresses) can be continuous, an example TSSE user interaction model can include the ability to move from small increments of time (seconds or minutes) or metadata parameters (different classes of IP addresses) using a zoom control 730. This zoom control can be combined with other metadata search parameters to enable the rapid movement through large amounts of data. Examples include but are not limited to:

Ability to zoom in and out around a given time from any second(s) to minute(s), hour(s), etc.
  Ability to zoom in to second resolution around 12:15 AM Jun. 3, 2005, for a specific data source type and physical machine location.

Presentation Density Control

Given the different types of users (humans and systems) and the varying types of time series data and events (e.g., single line events a few bytes in size, to multiple line events several megabytes in size) it is useful to be able to specify the density of the results. In one implementation the presentation density can be controlled 740 to return and/or display only the raw data without any metadata in a simple ASCII text format. Alternatively the same results can be returned and or displayed with full metadata as rich XML.

Implementation

The TSSE can be implemented in many different ways. In one approach, each box shown in the various figures is implemented in software as a separate process. All of the processes can run on a single machine or they can be divided up to run on separate logical or physical machines. In alternate embodiments, the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Therefore, although the detailed description contains many specifics, these should not be construed as limiting the scope of the invention but merely as illustrating different examples and aspects of the invention. It should be appreciated that the scope of the invention includes other embodiments not discussed in detail above. Various modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

The invention claimed is:

1. A computer-implemented method, comprising:
   obtaining log data generated by at least one component in an information processing environment;
   obtaining data that is not log data from a real-time monitoring environment;
   storing a plurality of events in a data store, wherein each event is derived from at least a portion of the log data and is associated with a time stamp extracted from the log data;
   storing the data that is not log data in the data store; and
   executing a search on one or more events of the plurality of events and at least a portion of the data that is not log data in the data store.

2. The computer-implemented method of claim 1, wherein the time stamp is extracted from the at least a portion of the log data from which a particular event of the plurality of events is derived.

3. The computer-implemented method of claim 1, wherein a particular event of the plurality of events includes the at least a portion of the log data.

4. The computer-implemented method of claim 1, wherein the data obtained from the real-time monitoring environment includes sensor data.

5. The computer-implemented method of claim 1, wherein the data obtained from the real-time monitoring environment includes measurement data.

6. The computer-implemented method of claim 1, wherein executing the search includes executing the search to find similar data.

7. The computer-implemented method of claim 1, wherein executing the search includes executing the search to find related data.

8. The computer-implemented method of claim 1, wherein executing the search includes executing the search to find the one or more events and the at least a portion of the data that is not log data within a defined time range.

9. The computer-implemented method of claim 1, wherein executing the search includes executing the search over a defined time range.

10. The computer-implemented method of claim 1, wherein executing the search includes executing the search to look for a frequency of distribution.

11. The computer-implemented method of claim 1, wherein executing the search includes executing the search to look for a pattern of occurrence.

12. The computer-implemented method of claim 1, wherein executing the search includes executing the search to find the one or more events and the at least a portion of the data that is not log data within a defined time range, and wherein the computer-implemented method further comprises causing display of results of the search.

13. The computer-implemented method of claim 1, wherein at least one of the log data or the data that is not log data comes from two or more sources.

14. The computer-implemented method of claim 1, wherein at least some of the data that is not log data is obtained synchronously.

15. The computer-implemented method of claim 1, wherein at least some of the data that is not log data is obtained asynchronously.

16. The computer-implemented method of claim 1, wherein obtaining log data comprises collecting the log data at more than one physical location.

17. The computer-implemented method of claim 1, wherein storing the plurality of events comprises:
   identifying boundaries within the log data that separate the log data into sections, wherein for a particular event of the plurality of events, the at least a portion of the log data corresponds to a particular section of the sections; and
   storing at least a portion of the particular section as at least a portion of the particular event.

18. The computer-implemented method of claim 1, wherein storing the plurality of events comprises:
   identifying boundaries within the log data that separate the log data into sections;
   extracting a time stamp from each section,
   wherein for a particular event of the plurality of events the at least a portion of the log data corresponds to a particular section of the sections and the time stamp extracted from the log data corresponds to the time stamp extracted from the particular section; and
   storing at least a portion of the particular section as at least a portion of the particular event.

19. The computer-implemented method of claim 1, wherein storing the plurality of events comprises:
   identifying boundaries within the log data that separate the log data into sections;
   extracting a time stamp from each section,
   wherein, for a particular event of the plurality of events, the at least a portion of the log data corresponds to a particular section of the sections and the time stamp extracted from the log data corresponds to the time stamp extracted from the particular section; and
   storing the plurality of events in chronological order based on the time stamp extracted from each section.

20. The computer-implemented method of claim 1, wherein storing the plurality of events comprises:
   aggregating the log data into the plurality of events;
   time stamping the plurality of events; and
   storing the plurality of events in the data store.

21. The computer-implemented method of claim 1, wherein storing the plurality of events comprises:
   aggregating the log data into the plurality of events using extraction to detect a beginning and ending of the plurality of events; and
   storing the plurality of events in the data store.

22. The computer-implemented method of claim 1, wherein storing the plurality of events comprises:
   aggregating the log data into the plurality of events using machine learning to identify boundaries between events; and
   storing the plurality of events in the data store.

23. The computer-implemented method of claim 1, wherein storing the plurality of events comprises:
   aggregating the log data into the plurality of events;
   time stamping the plurality of events;
   combining a group of the plurality of events into a hot index, which is not searchable and does not persist; and
   converting the hot index into a warm index when the hot index is at capacity, the warm index being stored in the data store.

24. The computer-implemented method of claim 1, wherein the search identifies a time range, the method further comprising:
  storing a plurality of indices, each index associated with a group of events of the plurality of events and identifying a period of time associated with the group of events,
  wherein executing the search comprises dividing the search into a plurality of sub-searches based on an identification of one or more indices of the plurality of indices that identify a period of time that satisfies the time range.

25. The computer-implemented method of claim 1, further comprising storing an index associated with a group of events of the plurality of events, the index comprising a plurality of tokens associated with the group of events, wherein each token of the plurality of tokens is associated with at least one event of the group of events.

26. The computer-implemented method of claim 1, further comprising storing an index associated with a group of events of the plurality of events, the index comprising:
  a plurality of tokens associated with the group of events, wherein each token of the plurality of tokens is associated with at least one event of the group of events, and
  an address for each event of the group of events.

27. The computer-implemented method of claim 1, further comprising storing an index associated with a group of events of the plurality of events, the index comprising:
  a plurality of tokens associated with the group of events, wherein each token of the plurality of tokens is associated with at least one event of the group of events,
  an address for each event of the group of events, and
  a posting list identifying an association between each token of the plurality of tokens with the address of the at least one event of the group of events.

28. The computer-implemented method of claim 1, further comprising:
  storing in volatile memory an index associated with a group of events of the plurality of events, the index comprising:
    a plurality of tokens associated with the group of events, wherein each token of the plurality of tokens is associated with at least one event of the group of events,
    an address for each event of the group of events, and
    a posting list identifying an association between each token of the plurality of tokens with the address of the at least one event of the group of events; and
  storing the index in non-volatile memory based on a determination that at least one of a threshold period of time is satisfied or a size of the index satisfies a threshold size.

29. A computing system, comprising:
memory; and
one or more processing devices coupled to the memory and configured to:
  obtain log data generated by at least one component in an information processing environment;
  obtain data that is not log data from a real-time monitoring environment;
  store a plurality of events in a data store, wherein each event is derived from at least a portion of the log data and is associated with a time stamp extracted from the log data;
  store the data that is not log data in the data store; and
  execute a search on one or more events of the plurality of events and at least a portion of the data that is not log data in the data store.

30. Non-transitory computer readable media comprising computer-executable instructions that, when executed by a computing system of a data intake and query system, cause the computing system to:
  obtain log data generated by at least one component in an information processing environment;
  obtain data that is not log data from a real-time monitoring environment;
  store a plurality of events in a data store, wherein each event is derived from at least a portion of the log data and is associated with a time stamp extracted from the log data;
  store the data that is not log data in the data store; and
  execute a search on one or more events of the plurality of events and at least a portion of the data that is not log data in the data store.

* * * * *